United States Patent
Tapling et al.

(10) Patent No.: US 10,025,920 B2
(45) Date of Patent: Jul. 17, 2018

(54) ENTERPRISE TRIGGERED 2CHK ASSOCIATION

(75) Inventors: Peter George Tapling, Park Ridge, IL (US); Andrew Robert Rolfe, East Dundee, IL (US); Ravi Ganesan, West Palm, FL (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

(21) Appl. No.: 13/490,677

(22) Filed: Jun. 7, 2012

(65) Prior Publication Data

US 2013/0333006 A1 Dec. 12, 2013

(51) Int. Cl.
*G06F 21/00* (2013.01)
*G06F 21/42* (2013.01)
(Continued)

(52) U.S. Cl.
CPC ............ *G06F 21/42* (2013.01); *H04L 9/3226* (2013.01); *H04L 9/3234* (2013.01);
(Continued)

(58) Field of Classification Search
USPC ..... 713/176, 179–181; 726/5–9; 705/64, 71, 705/75, 76
See application file for complete search history.

(56) References Cited

U.S. PATENT DOCUMENTS 5,661,807 A * 8/1997 Guski .................. H04L 9/3228
340/5.26

6,199,052 B1 * 3/2001 Mitty .................... G06Q 20/00
235/380
(Continued)

FOREIGN PATENT DOCUMENTS

JP 11-338933 12/1999
JP 200241398 A 2/2002
(Continued)

OTHER PUBLICATIONS

Microsoft Computer Dictionary 5th edition; copyright 2002.*
(Continued)

*Primary Examiner* — Morshed Mehedi
*Assistant Examiner* — Richard A McCoy
(74) *Attorney, Agent, or Firm* — Kilpatrick Townsend and Stockton LLP

(57) ABSTRACT

A method of operating a security server to securely transact business between a user and an enterprise via a network includes receiving, at the security server from an enterprise with which the user is currently connected via the network, a request of the enterprise to activate a secure communications channel over the network between the user and the security server. The request includes contact information for contacting the user via other than the network. The security server, in response, transmits an activation code for delivery to the user via other than the network and in a manner corresponding to the received contact information. The security server receives, from the user via the network, an activation code and compares the received activation code with the transmitted activation code to validate the received activation code. The secure communications channel is then activated based on the validation of the received activation code.

7 Claims, 8 Drawing Sheets

(51) Int. Cl.
*H04L 29/06* (2006.01)
*H04L 9/32* (2006.01)

(52) U.S. Cl.
CPC ........ *H04L 9/3247* (2013.01); *H04L 63/0428* (2013.01); *H04L 63/083* (2013.01); *H04L 63/18* (2013.01)

(56) References Cited

U.S. PATENT DOCUMENTS

| | | | |
|---|---|---|---|
| 6,334,116 B1 * | 12/2001 | Ganesan | G06Q 20/102 705/34 |
| 6,856,974 B1 * | 2/2005 | Ganesan | G06Q 20/02 705/35 |
| 7,146,338 B2 * | 12/2006 | Kight | G06Q 20/02 705/42 |
| 7,587,600 B2 * | 9/2009 | Bodensjo | G06F 12/1466 380/30 |
| 7,778,901 B2 * | 8/2010 | Ganesan | G06Q 20/02 705/35 |
| 7,788,172 B2 * | 8/2010 | Kight | G06Q 20/02 705/35 |
| 8,136,148 B1 | 3/2012 | Chayanam et al. | |
| 8,266,441 B2 * | 9/2012 | Inskeep | G06Q 20/341 713/185 |
| 2002/0087465 A1 * | 7/2002 | Ganesan | G06Q 20/10 705/39 |
| 2002/0095507 A1 | 7/2002 | Jerdonek | |
| 2003/0028451 A1 | 2/2003 | Ananian | |
| 2004/0030934 A1 | 2/2004 | Mizoguchi et al. | |
| 2004/0199431 A1 * | 10/2004 | Ganesan | G06Q 20/04 705/26.1 |
| 2004/0210536 A1 | 10/2004 | Gudelj et al. | |
| 2004/0225878 A1 | 11/2004 | Costa-Requena et al. | |
| 2004/0242238 A1 | 12/2004 | Wang et al. | |
| 2005/0097320 A1 | 5/2005 | Golan et al. | |
| 2005/0135242 A1 | 5/2005 | Larsen et al. | |
| 2005/0137978 A1 * | 6/2005 | Ganesan | G06Q 20/02 705/40 |
| 2005/0172229 A1 | 8/2005 | Reno et al. | |
| 2005/0187873 A1 * | 8/2005 | Labrou | G06Q 20/02 705/40 |
| 2005/0254653 A1 | 11/2005 | Potashnik et al. | |
| 2006/0059344 A1 * | 3/2006 | Mononen | H04L 63/061 713/171 |
| 2006/0168259 A1 | 7/2006 | Spilotro | |
| 2006/0168663 A1 | 7/2006 | Viljoen et al. | |
| 2006/0195396 A1 * | 8/2006 | Ganesan | G06Q 20/102 705/40 |
| 2006/0195397 A1 * | 8/2006 | Ganesan | G06Q 20/102 705/40 |
| 2006/0224888 A1 * | 10/2006 | Mansz | H04L 63/168 713/168 |
| 2006/0235795 A1 | 10/2006 | Johnson et al. | |
| 2006/0240805 A1 * | 10/2006 | Backholm | H04L 51/38 455/412.1 |
| 2007/0011724 A1 | 1/2007 | Gonzalez et al. | |
| 2007/0067828 A1 * | 3/2007 | Bychkov | 726/3 |
| 2007/0074276 A1 | 3/2007 | Harrison et al. | |
| 2007/0079135 A1 | 4/2007 | Saito | |
| 2007/0130472 A1 * | 6/2007 | Buer | H04L 63/0428 713/182 |
| 2007/0157304 A1 | 7/2007 | Logan et al. | |
| 2007/0174904 A1 | 7/2007 | Park | |
| 2007/0186095 A1 * | 8/2007 | Ganesan | H04L 9/0822 713/155 |
| 2007/0198437 A1 | 8/2007 | Eisner et al. | |
| 2007/0279227 A1 | 12/2007 | Juels | |
| 2007/0283273 A1 | 12/2007 | Woods | |
| 2008/0028447 A1 * | 1/2008 | O'Malley et al. | 726/6 |
| 2008/0034216 A1 | 2/2008 | Law | |
| 2008/0052180 A1 | 2/2008 | Lawhorn | |
| 2008/0109657 A1 * | 5/2008 | Bajaj et al. | 713/168 |
| 2008/0120707 A1 | 5/2008 | Ramia | |
| 2008/0172730 A1 | 7/2008 | Sandhu et al. | |
| 2008/0254765 A1 | 10/2008 | Eliaz | |
| 2008/0301057 A1 * | 12/2008 | Oren | G06F 21/31 705/71 |
| 2008/0313719 A1 * | 12/2008 | Kaliski, Jr. | H04L 63/0815 726/5 |
| 2009/0037983 A1 | 2/2009 | Chiruvolu et al. | |
| 2009/0093300 A1 | 4/2009 | Lutnick et al. | |
| 2009/0119754 A1 | 5/2009 | Schubert | |
| 2009/0119776 A1 | 5/2009 | Palnitkar et al. | |
| 2009/0132813 A1 | 5/2009 | Schibuk | |
| 2009/0235339 A1 | 9/2009 | Mennes et al. | |
| 2009/0249076 A1 | 10/2009 | Reed et al. | |
| 2009/0249077 A1 | 10/2009 | Gargaro et al. | |
| 2009/0254572 A1 | 10/2009 | Redlich et al. | |
| 2009/0259588 A1 | 10/2009 | Lindsay | |
| 2009/0259848 A1 * | 10/2009 | Williams et al. | 713/168 |
| 2009/0265768 A1 | 10/2009 | Labaton | |
| 2009/0288159 A1 | 11/2009 | Husemann et al. | |
| 2009/0328168 A1 | 12/2009 | Lee | |
| 2009/0328170 A1 | 12/2009 | Williams et al. | |
| 2010/0017860 A1 | 1/2010 | Ishida | |
| 2010/0024022 A1 | 1/2010 | Wells et al. | |
| 2010/0041391 A1 | 2/2010 | Spivey et al. | |
| 2010/0046744 A1 * | 2/2010 | Rhoads | G06F 17/30017 380/28 |
| 2010/0174900 A1 | 7/2010 | Lin | |
| 2010/0180328 A1 * | 7/2010 | Moas | G06F 21/34 726/6 |
| 2010/0235897 A1 | 9/2010 | Mason et al. | |
| 2010/0262834 A1 | 10/2010 | Freeman et al. | |
| 2010/0268831 A1 | 10/2010 | Scott et al. | |
| 2011/0029436 A1 | 2/2011 | Norvell et al. | |
| 2011/0107407 A1 * | 5/2011 | Ganesan | G06F 21/33 726/6 |
| 2011/0153496 A1 | 6/2011 | Royyuru | |
| 2011/0161989 A1 | 6/2011 | Russo et al. | |
| 2011/0185405 A1 * | 7/2011 | Ganesan | H04L 63/0838 726/6 |
| 2011/0208801 A1 | 8/2011 | Thorkelsson et al. | |
| 2011/0258452 A1 * | 10/2011 | Coulier | G06F 21/31 713/171 |
| 2011/0265149 A1 * | 10/2011 | Ganesan | H04L 9/3226 726/4 |
| 2011/0283340 A1 | 11/2011 | Ganesan | |
| 2011/0314288 A1 * | 12/2011 | Yogev | G06F 21/31 713/172 |
| 2012/0005483 A1 | 1/2012 | Patvarczki et al. | |
| 2012/0054095 A1 * | 3/2012 | Lesandro | G06Q 20/10 705/39 |
| 2012/0124651 A1 * | 5/2012 | Ganesan | G06F 21/31 726/4 |
| 2012/0192255 A1 * | 7/2012 | Ganesan | H04L 9/3215 726/6 |
| 2012/0240204 A1 * | 9/2012 | Bhatnagar | G06F 21/35 726/5 |
| 2013/0024918 A1 * | 1/2013 | Cramer | H04L 63/0838 726/6 |

FOREIGN PATENT DOCUMENTS

| | | |
|---|---|---|
| JP | 2002-259344 | 9/2002 |
| JP | 2003-534589 A | 11/2003 |
| JP | 2005-209083 | 8/2005 |
| JP | 2006109455 A | 4/2006 |
| JP | 2010518515 A | 5/2010 |
| JP | 2010-531506 A | 9/2010 |
| JP | 2013-518348 A | 5/2013 |
| JP | 2013-527708 A | 6/2013 |
| WO | WO 2007107868 | 9/2007 |
| WO | 2008/098004 A2 | 8/2008 |

OTHER PUBLICATIONS

International Search Report and Written Opinion, PCT/US2012/032840, dated Jun. 20, 2012.

(56) References Cited

OTHER PUBLICATIONS

Communication dated Mar. 3, 2016, from the Japanese Patent Office in counterpart application No. 2015-516018.
Communication dated Dec. 11, 2015 from the European Patent Office in counterpart application No. 13800916.2.
Written Opinion issued in Singapore Application No. 11201408022X dated Jul. 16, 2015.

* cited by examiner

ENTERPRISE TRIGGERED 2CHK ASSOCIATION

RELATED APPLICATIONS

This application is related to pending application Ser. Nos. 12/938,161, filed Nov. 2, 2010 and entitled "A NEW METHOD FOR SECURE SITE AND USER AUTHENTICATION", Ser. No. 13/006,806, filed Jan. 14, 2011 and entitled "A NEW METHOD FOR SECURE USER AND SITE AUTHENTICATION", Ser. No. 13/011,587, filed Jan. 21, 2011, and entitled A NEW METHOD FOR SECURE USER AND TRANSACTION AUTHENTICATION AND RISK MANAGEMENT", Ser. No. 13/011,739, filed Jan. 21, 2011, and entitled A NEW METHOD FOR SECURE USER AND TRANSACTION AUTHENTICATION AND RISK MANAGEMENT", Ser. No. 13/081,067, filed Apr. 6, 2011 and entitled "SECURE AND EFFICIENT LOGIN AND TRANSACTION AUTHENTICATION USING IPHONES™ AND OTHER SMART MOBILE COMMUNICATION DEVICES", Ser. No. 13/081,150, filed Apr. 6, 2011 and entitled "FLEXIBLE QUASI OUT OF BAND AUTHENTICATION ARCHITECTURE", Ser. No. 13/089,430, filed Apr. 19, 2011 and entitled "KEY MANAGEMENT USING QUASI OUT OF BAND AUTHENTICATION ARCHITECTURE", and Ser. No. 13/332,912, filed Dec. 21, 2011 and entitled "SECURE AND EFFICIENT AUTHENTICATION USING PLUG-IN HARDWARE COMPATIBLE WITH DESKTOPS, LAPTOPS AND/OR SMART MOBILE COMMUNICATION DEVICES SUCH AS IPHONES™". The contents of the above identified applications are hereby incorporated herein in their entirety by reference.

TECHNICAL FIELD

This invention relates to security and privacy. More particularly it relates to web based login and transaction authentication, including web based signatures, using hardware plug-in devices compatible with desktop and/or laptop computers, and/or smart mobile communication devises, such as Apple iPhones™.

BACKGROUND OF THE INVENTION

User authentication using techniques such as passwords, one time passwords (OTPs), hardware or software smartcards, etc., have all proven to be either too weak and susceptible to man in the middle (MITM) or man in the browser (MITB) attacks, or else have proven too cumbersome and expensive. The use of single sign on techniques such as OpenID, FaceBook Connect, etc., only make the problem worse as once the attacker has compromised the master account they can now break into all other accounts that rely on that initial login. Further, the focus of attackers has shifted from trying to break the login process to using sophisticated techniques to come in after the act of login and to attack the transactions being performed. This has made transaction authentication, the act of confirming if the transaction seen at the back end web server is identical to that intended by the user, even more important.

Out-of-band authentication (OOBA), a technique by which a transaction is relayed to the user, and confirmation obtained, using an alternate form of communication, for instance by placing a voice phone call or a text message, is a promising alternative, but is also to inconvenient and costly to be used very often. It might be useful for the highest value transactions, or rare events like password resets, but using it for large numbers of transactions is too costly and cumbersome.

Recently, an innovative new authentication system and protocol has been developed to address some of these problems. Specifically, a system and protocol, commonly referred to as "2CHK", can provide a user with an OTP to enable login into a website (i.e. authentication of the user to the website) or to electronically sign a transaction entered into with a website, based on a secret shared between the website and the security server. Of particular utility is the fact that 2CHK provides the security of one time passwords, but does not require a per user shared secret which all prior OTP systems and protocols have required.

It is common when users browse an eCommerce website, such as a merchant, bank or broker website, for them to see Payment Buttons such as that provided by PayPal. When the user clicks on that payment functionality, the user is typically interacting directly with the payment provider. This means the user does not reveal their credentials for authenticating to the payment provider to the eCommerce site. This is an important feature that is no longer available when a user is interacting with the eCommerce site using a smart phone app the website provides. Thus, 2CHK can be implemented using a separate secure client application, commonly referred to as the "2CHK client", which has an independent secure communication channel to a back end authentication server. The 2CHK client can be implemented as dedicated software on a computing device, or as a browser based application, or as an application on a mobile communications device, including a smart phone, such as an IPhone.

For example, the 2CHK client can be used to show user transactions either to inform the user of the transaction, allow the user to confirm/deny the transaction and/or provide the user with a transaction signature, i.e. an OTP, which he/she can use in another application, such as a merchant or bank website application, to sign off on the transaction. Furthermore, the 2CHK client can also provide the user with an OTP that can be used to login to different websites or other applications. Depending on the implementation, 2CHK can use either of two distinct methods for generating such OTPs. One in which the OTP is provided by the authentication server, and the other in which the 2CHK client is "seeded" during activation so it can then generate OTPs without any connection to the backend authentication server.

The profusion of smart phones has resulted in the coming to market of adjunct pieces of hardware that can attach to the smart phones using various interfaces. Much like one can attach a printer to a computer using a USB port and/or cable, one can also attach devices to smart phones using for instance the ubiquitous headphone jack. Thus, the 2CHK client has been adapted to execute on such adjunct hardware and thereby provide for efficient and secure login authentication and transaction authorization using plug-in hardware compatible with smart mobile communication devices and Internet connectable personal computing devices.

OBJECTIVES OF THE INVENTION

The present invention is directed further improvements to the 2CHK system and protocol that can provide additional flexibility in implementing 2CHK login authentication and/or transaction authorization on personal computing devices and smart mobile communication devices such as iPhones and iPads, including implementations with adjunct hardware, and/or enhanced protection against attackers.

Additional objects, advantages, novel features of the present invention will become apparent to those skilled in the art from this disclosure, including the following detailed description, as well as by practice of the invention. While the invention is described below with reference to one or more preferred embodiments, it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

According to aspects of the present invention, a security server can be operated to securely transact business between a user and an enterprise via a network, such as the Internet. To do so, the security server receives, from an enterprise with which the user is currently connected via the network, a request of the enterprise to activate a secure communications channel over the network between the user and the security server. The request includes contact information for contacting the user via other than the network, such as a telephone or cell phone number, mail address or other contact information. It will be recognized that the user is typically represented on the network by a user network device, such as a personal computer, smart phone or smart pad, and the enterprise is typically represented on the network by a network site, such as a website server.

In response to the received activation request, the security server transmits an activation code for delivery to the user via other than the network and corresponding to the received contact information. For example, the activation code might be transmitted to an out-of-band authentication service which uses the public switched telephone network or the cellular network for delivery of information. Such a service would preferably be represented on the network, although this is not mandatory. On the other hand, the activation code might be transmitted in any number of ways to the postal mail service, private mail service, or a messenger service for hand delivery or direct aural delivery to the user, in which case these services would be out-of-band delivery services since they will deliver the authorization code to the user outside the network, e.g. the Internet.

Next, the security server receives an activation code from the user via the network, and compares the received activation code with the transmitted activation code to validate the received activation code. If the activation code is validated based on the comparison, the security server also activates the secure communications channel between it and the user. For example, all subsequent communications between the user and security server may be encrypted with a symmetric crypto-key based on the authorization code, since both the user and security server have knowledge of this code at this point.

It is perhaps worthwhile to emphasize here that it should be understood that the term "network" is used herein generically to refer to a digital communications network, where the public Internet, local area networks, or private secure networks are some exemplary types. Many of the implementations of this invention will utilize a single type of network for all communications channels, e.g. the Internet, while other implementations could use multiple different network types for different channels (for example the "network" may include multiple different type networks with one channel provided via a private type network, while another channel is provided via the Internet). Thus, it will also be understood that the invention does not require the various different communications channels to be provided via any particular type of network or via the same network type, but only requires that the transmission of the activation code for delivery to the user be via channel that is outside of the network type used for the other channels, particularly the channels used for communications between the user and security server and between the user and enterprise.

According to other aspects of the invention, the security server receives transaction information including an identifier of the enterprise and details of a transaction which the user desires to enter into with the enterprise. It will be understood that the transaction can be of virtually any type. Common transactions performed over networks such as the Internet include, but are not limited to transfers of money from an account, purchases of stocks or bonds, and purchases of products or services. The transactions details for such transactions typically include such items as account numbers, product codes, amounts to be transferred or paid, and other information deemed appropriate to clearly detail the transaction so there is no later dispute between the user and the enterprise as to what the user had authorized. The security server transmits the received transaction information to the user via the secure communications channel. If a valid user signature on the transaction is required by the enterprise, the security server generates, based on the received transaction information, a one-time password for use by the user as a transaction signature, and transmits the generated one time password from the security server to the user via the secure communications channel. The one-time password is preferably generated based also on a secret shared by the security server and the enterprise but not known to the user or associated with any particular user. In any event, the security server could, but typically does not, receive, from the enterprise, confirmation of receipt by the enterprise from the user of the validly signed transaction. However, after the transmitting of the one-time-password to the user, the user transmits the one-time-password received from the security server to the enterprise, preferably via the network.

According to still other aspects of the invention, the same secure communications channel can be used for transactions between the user and various different enterprises. Thus, the security server can receive other transaction information including an identifier of another enterprise and details of another transaction which the user desires to enter into with the other enterprise. If so, the security server can transmit this other transaction information to the user via the same secure communications channel. If a valid user signature on this other transaction is required by the other enterprise, the security server generates, based on the received other transaction information, another one-time password for use by the user as a transaction signature, and transmits this generated other one time password to the user via the secure communications channel. It should be noted that this one-time password is preferably generated based also on a secret shared by the security server and this other, second, enterprise, but not known to the user or the first enterprise, or associated with any particular user. In any event, the security server next receives from the other enterprise, confirmation of receipt by the other enterprise from the user of the validly signed transaction, and transmits, to the user via the secure communications channel, confirmation that the second enterprise received the validly signed transaction.

According to yet other aspects of the invention, the security server may incorporate, e.g. embed, the received transaction information into at least one of a voice stream and an image, in which case the transmitted transaction information is the transaction information incorporated into the at least one of the voice stream and the image. Preferably, the voice stream is a voice stream having a voice recognizable by the user, e.g. the user's own voice or the voice of a well known celebrity, e.g. Franklin D. Roosevelt or John F. Kennedy, or Ronald Reagan, and the image is an image having a background known to the user, such as a preselected picture of, for example, the Mona Lisa.

It should also be understood that the method will typically be implemented by a server having one or more ports through which it communications via the network and a processor with the programmed logic, typically but not necessarily executable software, to perform as described above.

A security server can also be operated using staged activation to securely transact business between a user and an enterprise via a network by receiving, from a user via the network, a request of the user, including contact information for contacting the user via other than the network, to activate a secure communications channel over the network between the user and the security server. In such a case, the security server, in response, transmits notification that the secure communications channel is quasi activated to the user via the network. Later, the security server receives transaction information including an identifier of an enterprise and details of a transaction which the user desires to enter into with the enterprise. In response, the security server transmits an activation code for delivery to the user via other than the network and corresponding to the received contact information. As discussed above, delivery to the user via other than the network could involve an out-of-band authentication service or some other service. In any event, the security server receives an activation code from the user via the network, compares the received activation code with the transmitted activation code to validate the received activation code, and activates the secure communications channel based on the validation of the received activation code. The security server also transmits the transaction information to the user via the activated secure communications channel.

A user network device can also be operated to generate one-time-passwords, which are usable to securely transact business via a network, using persistently saved seeds. To do so, the user network device transmits, to a security server via the network, a user identifier identifying the user and request to activate a secure communications channel between the user network device and the security server. In response, the secure communications channel is activated and the user network device receives a seed from the security server via the activated secure communications channel. The seed is a crypto-key corresponding to the transmitted user identifier and a secret known only to the security server, which can be subsequently used to generate, for example, one-time-passwords, that in turn can for example be used to authenticate a user to a network enterprise or sign a transaction with the a network enterprise. The received seed is persistently stored at the user network device, but will be deleted after activation of the secure communications channel expires. That is, the seed will be reestablished each time the secure communications channel is reactivated, but once reestablished will remain available for the duration of the period during which the secure communications channel is active. So long as the secure communications channel is activated, the user network device can generate one-time-passwords based on the stored seed.

PREFERRED EMBODIMENT(S) OF THE INVENTION

The 2CHK System

Figure 1:
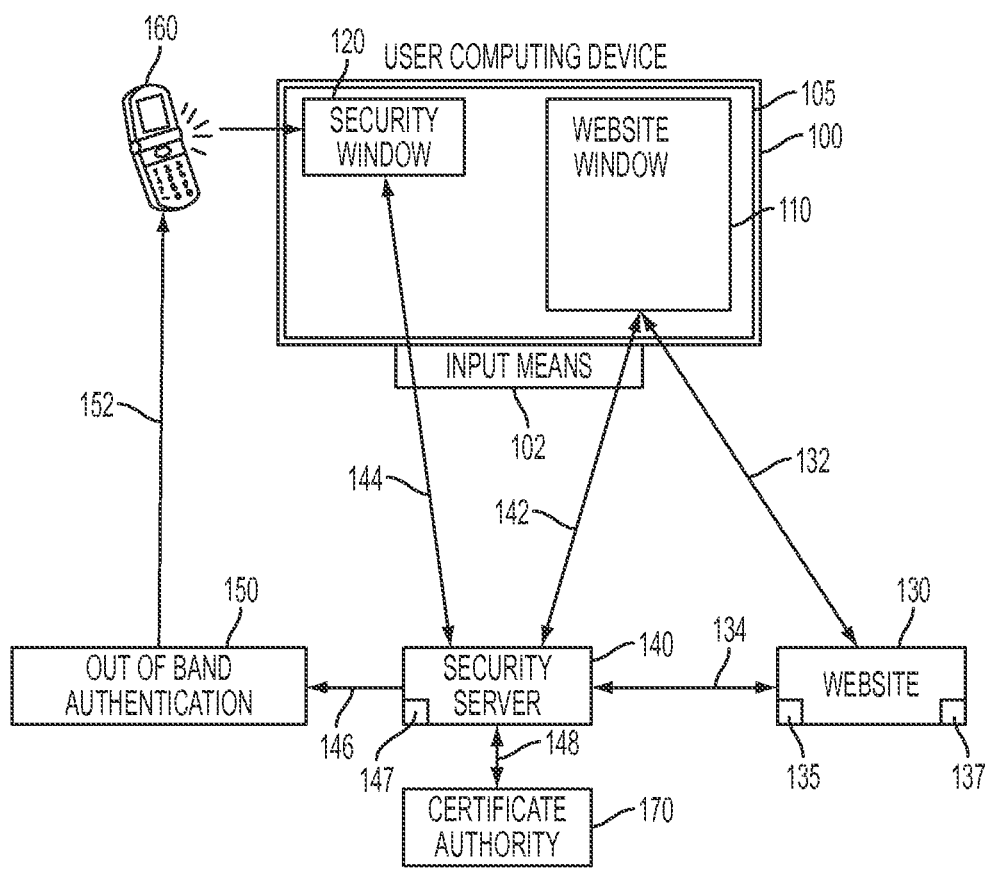
FIG. 1 depicts components of a 2CHK security system, in accordance with the present invention.

Referring to FIG. 1, the 2CHK system preferably includes some or all of the following:

- A user computing device 100, such as a desktop or laptop computer, smart phone or smart pad, that is connectable to a network, such as the Internet, and having an input means 102, such as a keyboard, keypad, mouse, or other means of entering user inputs and a screen 105 capable of displaying (1) pages associated with a website, hereinafter referred to as a "website page", in a window 110, hereinafter referred to as the "website window", (2) pages associate with a security server in a window 120, hereinafter referred to as the "security window", and (3) other pages associated with any of various applications that may be executing on the user computing device at any given time.
- A website 130, typically represented on the network by a website server, that is accessible to users via the network and at which the user is, or wishes to be, logging-in or performing a transaction and optionally includes an application programming interface (API) 135 and Key Management Logic—API (KMLWS) 137. It should be understood that in a practical implementations, there would typically be multiple different websites accessible via the network.
- A security server 140 that is accessible to users via the network and optionally includes Key Management Logic—Server (KMLS) 147.
- An out-of-band (OOB) authentication server 150, hereinafter referred to as the "OOBA server".
- An certificate authority (CA) 170.
- An user communication device 160, such as a hardwired device, e.g. a conventional landline telephone, or mobile device, e.g. a cell phone or smart phone, etc.
- A communications channel 132, established via the network, for communicating information between the website 130 and the website window 110.

An optional secure communications channel 134, established via the network or otherwise, for directly communicating information between the website 130 and the security server 140.

A communications channel 142, established via the network, for communicating information between the security server 140 and the website window 110.

A secure communications channel 144, established via the network, for communicating information between the security server 140 and the security window 120.

A secure communications channel 146, established via the network or otherwise, for communicating information between the security server 140 and the OOBA server 150.

A secure communications channel 148, established via the network or otherwise, for communicating information between the security server 140 and the CA 170.

A communications channel 152, established via other than the network, for communicating information between the OOBA server 150 and the user communication device 160.

Figure 2:
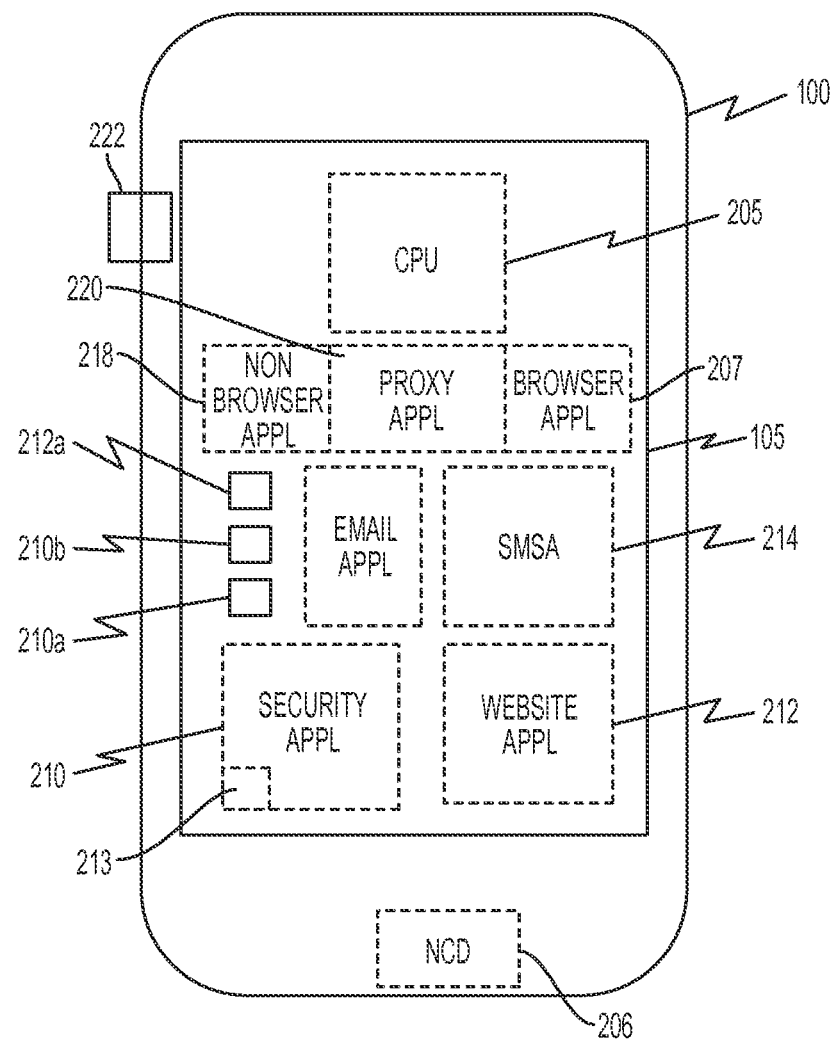
FIG. 2 depicts a user computing device of FIG. 1, without adjunct hardware, in accordance with the present invention.

Referring to FIG. 2, the user computing device 100 preferably includes some or all of the following:

A central processing unit (CPU) 205.

Network communications devices (NCDs) 206, such as a modem and port, for communicating with the website 130 and security server via the network A web browser application 207 capable of being executed by the CPU 205 (1) to create a browser window which serves as the website window 110, and to generate, and display in the browser website window 110, website pages transmitted from website 130 and other websites (not shown), and (2) to create a browser pop-up window which serves as the security window 120, and to generate, and display in the pop-up security window 120, pages transmitted from security server 140. Website pages displayed by the browser 207 may sometimes be referred to hereinafter as web pages.

A security application 210, which may sometimes be hereinafter referred to as the "2CHK client application", capable of being executed by the CPU 205 to create the security window 120, and to generate and display in the 2CHK security window 120, pages transmitted from security server 140. Security application 210 may include Key Management Logic—Client (KMLC) 213.

Local storage, which may be implemented in a memory and/or a hard drive data store, including private stores 210*a* and 212*a*, and public store 210*b*.

A website application 212, such as a merchant or bank application, capable of being executed by the CPU 205 (1) to create the website window 110, and to generate, and display in the website window 110, website pages associated with website 130. It should be understood that in a practical implementations, there could be multiple different website applications each associated with a different website accessible via the network.

A short message service (SMS) application 214, which will hereinafter sometimes be referenced to as the "SMSA", for text messaging An email application 216, for sending and receiving emails via the network.

A document processing application 218, such a Adobe Acrobat or Microsoft Word capable of being executed by the CPU 205 to generate, and display in a window (not shown), documents created on or transmitted, via the network, to the computing device. It should be understood that in a practical implementations, there could be multiple different document processing applications.

A proxy application, which may sometimes be hereinafter referred to as the "2CHK proxy client application", capable of being executed by the CPU 205 to create a secure pipeline for communications between a security application executing on adjunct hardware and the security server 140.

A port 222 for communicatively connecting the computing device 100 to adjunct hardware.

Figure 3:
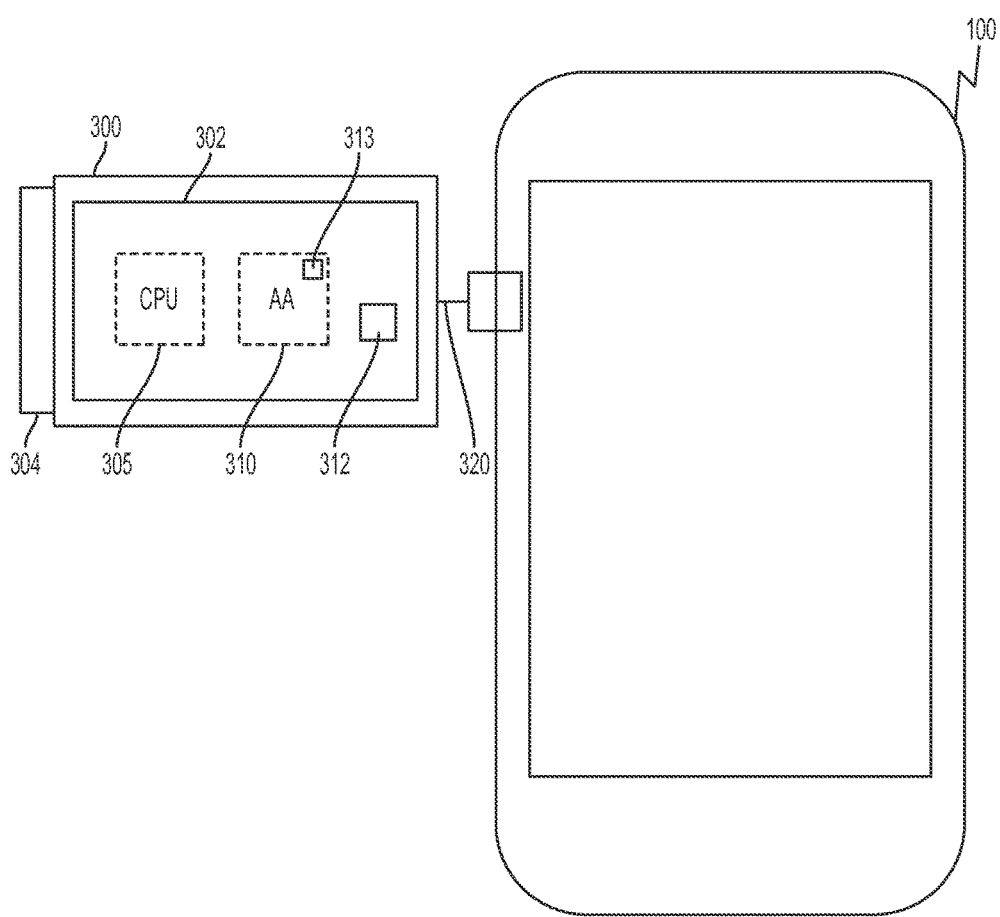
FIG. 3 depicts a user computing device of FIG. 1, with adjunct hardware connected thereto, in accordance with the present invention.

Referring to FIG. 3, adjunct hardware 300, which may be communicatively interconnected to and disconnected from the user computing device 100, preferably includes some or all of the following:

A display screen 302.

An input means 304, such as a keypad, keyboard, mouse, or other means of entering user inputs.

A central processing unit (CPU) 305.

A security application 310, which may sometimes be hereinafter referred to as the "2CHK client application", capable of being executed by the CPU 305 to create the security window 120 on the display screen 302, and to generate and display in the security window 120, pages transmitted from security server 140. Security application 310 may include an API 311 and Key Management Logic—Client (KMLC) 313.

Local storage, which may be implemented in a memory and/or a hard drive data store, including private store 312.

A communications link 320, such as one established, for example, via a USB cable, near field communications (NFC), Bluetooth, or a headphone jack, etc., for transmitting information between the port 222 of the user computing device 100 to which the adjunct hardware 300 is connected and the adjunct hardware 300.

As noted above, the security window 120 may be displayed on the screen 105 of the computing device 100 in a pop-up security window created by the browser application 207, or in a non-browser security window created by a security application 210, i.e. the 2CHK client. The security window 120 may also be displayed on the screen 302 of the adjunct hardware 300 in a non-browser security window created by a security application 310, i.e. the 2CHK client. The security application 210 can be implemented in any of a variety of different form factors. One variety contemplates the security window 120 being controlled by a security application 210 on a mobile computing device, such as a smart phone or smart pad, e.g. by a 2CHK client smart phone app. Another contemplates the security window 120 controlled by a security application 210 on a higher powered computing device, such as a desktop or laptop computer, e.g. by a 2CHK client personal computer (PC) application. Still another, as noted above, contemplates the security window 120 being controlled by a security application 210 executed on dedicated or non-dedicated adjunct hardware 300, such as a smartcard, which has communication capabilities. As will be discussed further below, these form factors provide additional layers of security simply by being independent of the user's PC running the browser. It will be recognized that implementation on smart phone is easily accomplished because the phone is already personalized and, in accordance with the techniques described below, OTP generation relies on the use of a secret shared by only the website 130 and security server 140, and therefore the smart phone does not need to store a special secret or execute OTP software. Rather, only the website 130 and the security server 140 need share the necessary secret and only the security server 140 and website 130 need generate the OTPs required for user login authentication and transaction signature.

In accordance with certain aspects of the invention, the security application or 2CHK client 210 uses both private store 210a and public store 210b, and website application 212 also uses public store 210b as well as private store 212a. As will be discussed in more detail below, the CPU 205 can execute the security application 210 to interact with the security server 120 via communication channel 142 and can execute the browser or website application 212 to interact with the website 130 via communication channel 132 and the security server 120 via communication channel 142.

As shown in FIG. 3, 2CHK client functionality may be made available on dedicated or non-dedicated adjunct hardware 300 that can be communicatively attached, e.g. via a USB cable, near field communications (NFC), Bluetooth, or a headphone jack, etc., to a computing device, such as a PC or smart phone, in a manner similar to other adjunct pieces of hardware. The adjunct hardware could be of any type including, for example, smart cards, a secure storage device, a secure display device, or a secure source of adjunct identification information, such as a certificate store, or biometric reader, or fingerprint protected storage, etc. It should also be understood that the adjunct hardware could be a smart phone communicatively attachable to a PC, and that instead of a desktop, laptop or smart mobile device, any Internet connected device such as a gaming device, a TV, a DVD player, etc., could be substituted for the computing device 100 and be the intermediate point serving as the proxy or conduit to the adjunct hardware. Having the 2CHK client functionality on the adjunct hardware can result in an even higher security to protect against attacks on the computing device 100 itself.

With the 2CHK client functionality residing on adjunct hardware, the computing device 100 (be it a desktop or laptop computer or a smart phone or smart pad) is basically acting as a conduit (or proxy) to ferry messages between the security server 140 and the adjunct hardware attached to the computing device 100. That is, the role played by the security application, i.e. the 2CHK client, 210 executing on the computing device 100 is instead now played by the security application, i.e. 2CHK client, 310 executing on the adjunct device.

The adjunct hardware 300 is removably connected to the computing device 100 via the port 222 and communications link 320. The security app, i.e. 2CHK client, 310 is executable by the CPU 315 and users both private store 312 and public store 210b. The security app, i.e. 2CHK client, 310 interacts with the security server 140 via secure communication channel 144, the proxy 220, port 222 and communications link 320. The proxy/conduit app 220 is executed by the CPU 205 to serve, together with communication link 320, port 222 and communications channel 144, as a secure communication pipeline, between the security server 140 and security application 210. It also serves, together with communication link 320 and port 222, as a communication pipeline between the security application 310 and the public storage 210b on the computing device 100. Accordingly, communications between the security server 140 and the security window 120 cannot be read or manipulate by the computing device 100 serving as the "conduit/proxy". Stated another way, data passing through the computing device 100 to the adjunct hardware is encrypted or encoded in such a manner as to only be readable by the security app, i.e. 2CHK client, 310 executing on the on the adjunct hardware.

The 2CHK System Operations

There are 5 distinct phases of operation: (i) the set-up and personalization of the security window 120, which is a one time process, (ii) the start-up or activation of the security window 120, whether a pop-up security window or 2CHK security window, which happens at periodic intervals, similar to logging into a computer at each use, (iii) the authentication of a website 130 to the user, when the user browses to a website 130 that authenticates itself to the user via the security server 140, (iv) the authentication, e.g. for login purposes, of a user to a website 130 or website application 212 by the security server 140, when the user browses to a website 130 or activates a website application 212, and (v) the authorization of transactions or transaction signing, when the user browses to a website 130 or uses website application 212 and wishes to enter into a particular transaction with the website 130.

The Set-Up and Personalization Phase

The user initiates its association with the 2CHK system via a set up and personalization phase, which is a one-time process. For set-up the user visits a network site hosted at the security server 140. If a security application, i.e. 2CHK client, 210 or 310 is to be utilized in the implementation, the applicable security application is uploaded to the user's computing device 100 and stored thereon or on the adjunct hardware 300, typically on local storage, e.g. memory, hard drive or other local storage options, available on the applicable device 100 or 300. It should be understood, that in some implementations both security application 210 and security application 310 will be utilized and thus will both need to be uploaded during the set-up process. The user selects a personalization image. This image is stored locally on the user's computing device 100 using cookies. This is in general a one-time event per user per user computing device 100, and only need be repeated if the user wants to change the personalization image, or the local storage is deleted for some reason.

The Start-Up and Activation (Security Server Login) Phase

Referring now to FIGS. 4, 6, 7 and 8. Activation will typically occur periodically, for instance once a day before the user begins browsing the web. Depending on the implementation, the user can initiate the activation process manually, or, alternately, the activation process could be initiated automatically when the user visits a website 130 that participates in the 2CHK system. Thereafter, the security server 140 will activate the security window 120 based on validation of the user via OOBA via the OOBA server 150. However, it should be understood that other, non-OOBA, forms of validation could be used at this phase, if so desired. It will be recognized that other forms of validation may provide easier integration of the 2CHK system with existing OTP deployments.

Using what is commonly referred to as an "open" model OOBA for start-up, the activation is preferably triggered by the user as follows. To validate the user to the security server 140, either (1) the user enters his/her phone number, e.g. hardwired telephone, cell phone, or smart cell phone number, into the security window 120 displayed by the security application, i.e. 2CHK client, 210 or 310, or browser application 207 (if the security window is a browser pop-up security window), executing on the computing device 100, e.g. a desktop computer or smart phone, or adjunct hardware 300, or (2) the security application 210 or 310 or browser 207 obtains the number directly from the user's computing device 100. The entered or otherwise obtained phone number is transmitted from the computing device 100 to the security server 140 via communications channel 144 or from the adjunct hardware 300 to the security server 140 via communications link 320 and channel 144 (FIG. 8, step 800).

Figure 8:
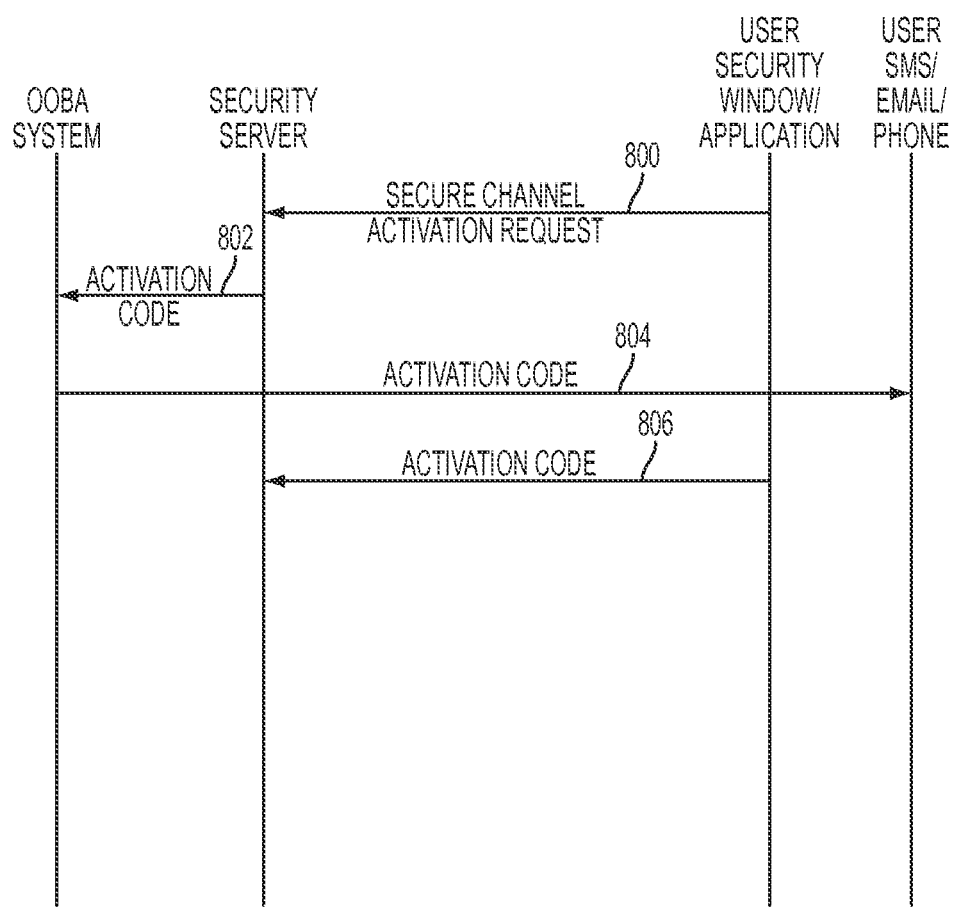
FIG. 8 depicts open model OOBA for activation of a secure communications channel in accordance with aspects of the present invention.

The security server 140 communicates a login security code to the OOBA server 150 via communication channel 146 (FIG. 8, step 802). The OOBA server 150 communicates with the user's cell phone, smart pad or telephone 160, via communication channel 152, to provide the user with the login security code to authenticate the user to the security server 140 (FIG. 8, step 804). The OOBA server 150 conveyance of the activation code to the user can include, but is not limited to text messaging, voice call, email, or any other communications channel which is substantively different from the channel by which the security application 210 or 310 or browser 207 or security window 120 communicates with the security server 140, making it substantively more difficulty to compromise both channels.

If the communications channel 152 is interactive, which will most typically be the case, then the communication channel 152 can optionally be utilized to interact with the user to authenticate the user more fully prior to the delivery of the activation code, by capturing additional authentication information to compare with identity information accessible by the OOBA server 150, including but not limited to shared secrets, geographic location information, and biometric identifiers.

A keyed hash of the security code, or the unhashed security code itself, is sent to the security server 140 over an encrypted communications channel 144, and link 320 if applicable (FIG. 8, step 806). Such validation of the user to the security server 140 is of course performed prior to the security server 140 providing the user, via the security window 120, with the credentials required for authenticating to website 130, e.g. for website login purposes, or for authorizing a transaction with the website 130.

Figure 4:
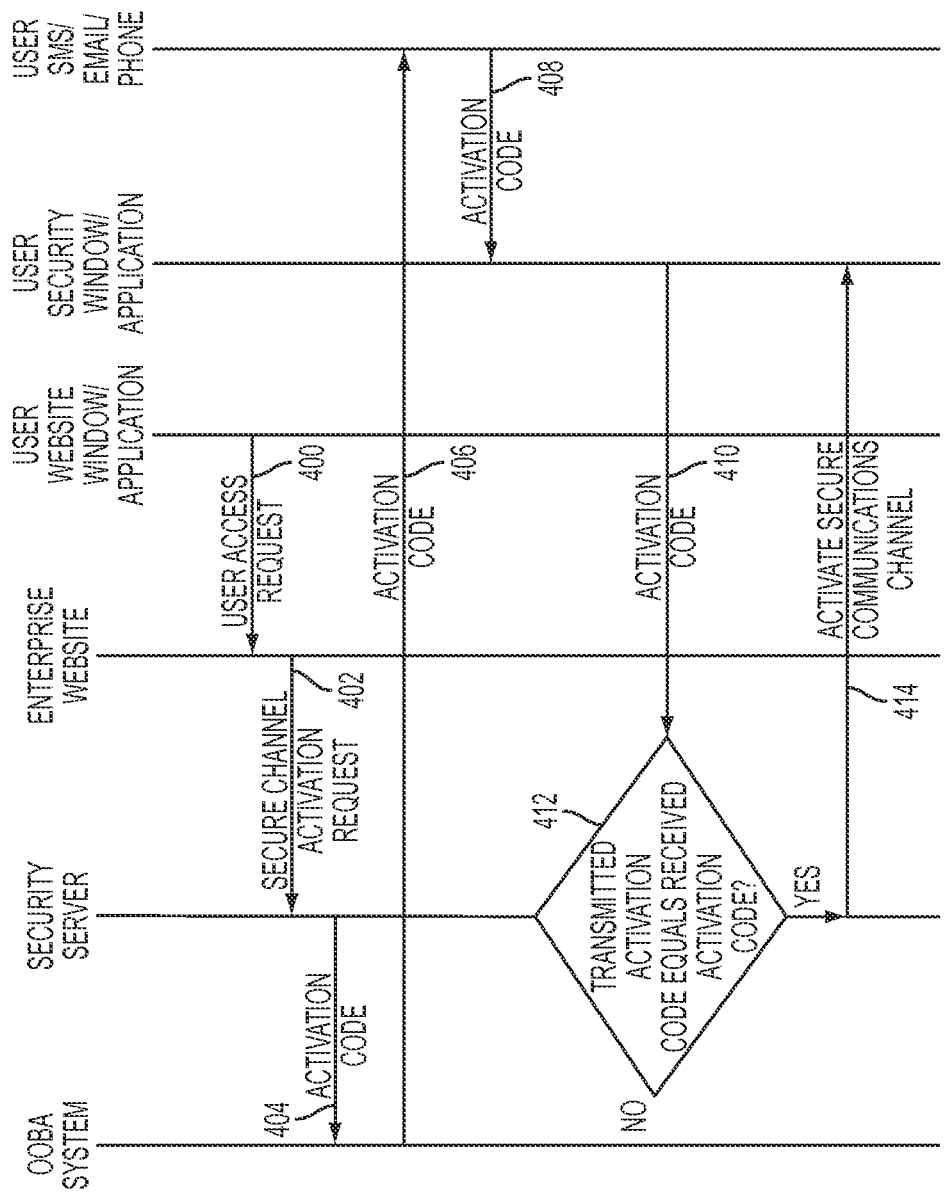
FIG. 4 depicts the activation of a secure communications channel in accordance with aspects of the present invention.

On the other hand, if what is commonly referred to as an "association" OOBA model is utilized for start-up, the activation is preferably triggered by an enterprise, e.g. website 130, rather than the user. Accordingly, the user has no need to, and therefore does not, enter a phone number into the security application, i.e the 2CHK client, 210 or 310 in the association OOBA model. Instead, the user logs in to an enterprise, e.g. website 130, using a website 130 security mechanism conveyed by the browser application 207, or a website application 212 security mechanism, such as a user identifier and password combination (FIG. 4, step 400). The user requests 2CHK association by selecting, from a website 130 web page presented by the user's browser application 207 or website application 212 in the website window 110.

For example, the user might be asked to request 2CHK association by selecting identify information, including contact information such as a masked address or phone number, i.e. an address or phone number that is a priori available to the website 130, and which is not completely shown to the user, e.g. 415.680.xxxx. In such a case, the website 130 sends an association request with phone number, e.g. hard wire telephone, or cell phone number, to the security server 140 for use by the security server 140 in authenticating and activating the user (FIG. 4, step 402). It should be noted that, if desired, the contact information could, in lieu of information for contacting the user via telephone call, be information for contacting the user by hand delivery, NFC/Bluetooth exchange, or knowledge based authentication (KBA) inquiry, etc., with the applicable identify information, preferably masked, being selected by the user. Alternatively, the user might be asked to request 2CHK association by simply clicking on a 2CHK activation box. In such a case, the website 130 can, if desired, generate and send an enterprise activation code to the security server 140 for use by the security server in authenticating and activating the user (FIG. 4, step 402).

Figure 7:
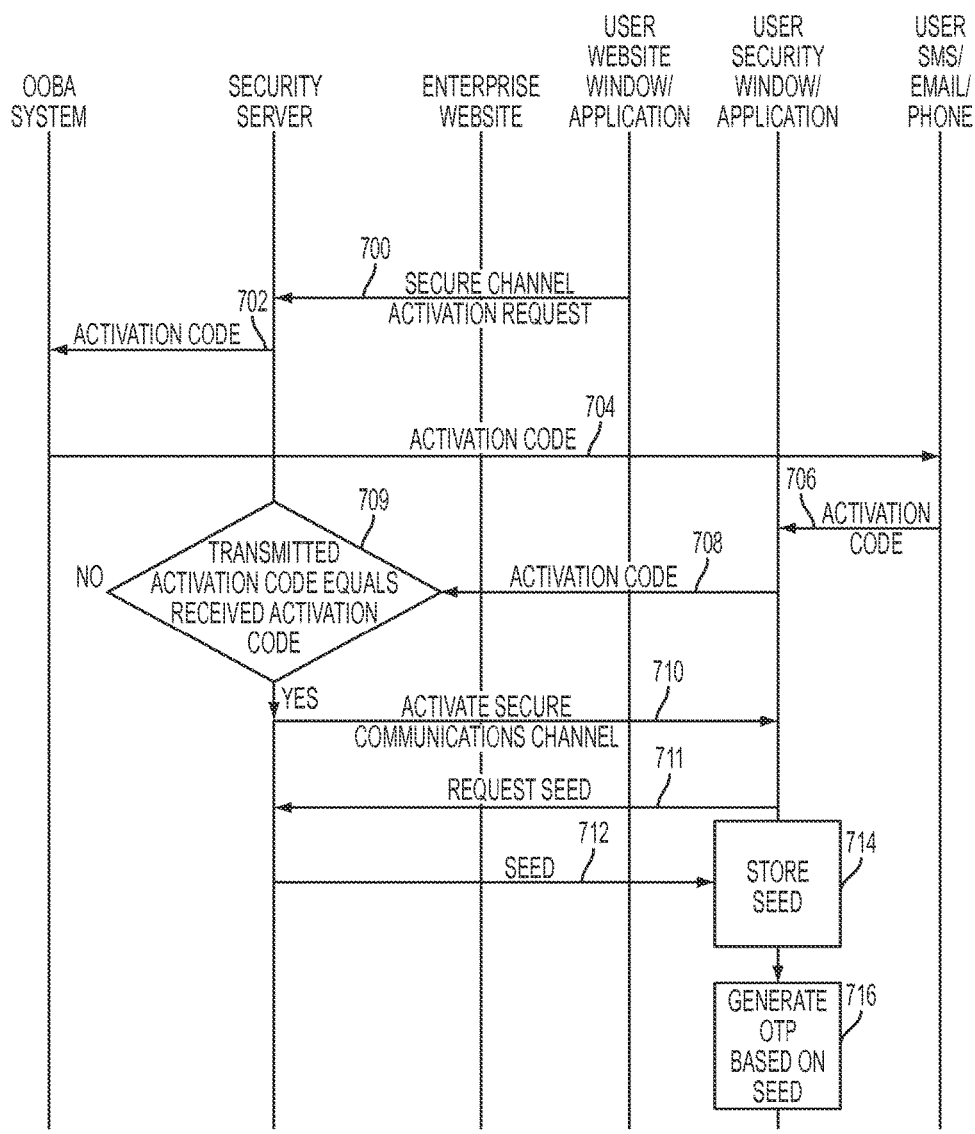
FIG. 7 depicts crypto-key seeding in accordance with aspects of the present invention.

The website 130 or website application 212 transmits an association request, preferably with the identify information, including the full selected contact information e.g. the full selected phone number, e.g. 415.680.0000, or user identify information (not selected by the user) and an enterprise activation code, to security server 140 via communications channels 132 and 142 between the website window 110 and the security server 140, or via a direct secure communications channel 134 between the website 130 and security server 140, as applicable (FIG. 4, step 402, or FIG. 7, step 700).

From this point, the security server 140 proceeds identically to the "open" model, with the exception that the identity information available, and perhaps an activation code, for OOBA comparison now comes from both the security server and the enterprise. The identity information or code is preferably unique to the applicable request for the applicable enterprise and is simultaneously delivered to the end user, e.g. via public switch telephone network (PSTN) (FIG. 4, steps 404 and 406, or FIG. 6, steps 608 and 610, or FIG. 7, steps 702 and 704), and stored within the security server 140. The security server 140 waits for a security application, i.e. the 2CHK client, 210 or 310 to deliver security server activation code, and the enterprise activation code if applicable (FIG. 4, steps 408 and 410, or FIG. 6, steps 611 and 612, or FIG. 7, steps 706 and 708), and upon receiving the code(s) binds the security application, i.e. 2CHK client, 210 or 310 to the particular request from the enterprise, e.g. website 130. That is, a keyed hash of the security code(s) is sent to the security server 140 over encrypted communications channel 144, and link 320 if applicable. If the user is validated by the security server based on the received code(s) (FIG. 4, step 412, or FIG. 6, step 614, or FIG. 7, step 709), further communications between the security server 140 and the security application, i.e. 2CHK client, 210 or 310 are encrypted using the activation code(s), directly or indirectly, such that communications channel 144, and link 320 if applicable, are secure. Here, of course, such validation of the user to the security server 140 is performed after the user has provided the credentials required for authenticating to website 130, e.g. for website login purposes, but prior to security server 140 providing the user, via the security window 120, with the credentials, transmitted over the secure communications channel 144, and link 320 if applicable, required for authorizing a transaction with the website 130.

The importance of the association between the user and the enterprise with the 2CHK system is the binding to a particular account/relationship for a particular enterprise. Thus, here the enterprise controls the process, allowing or enabling the security application, i.e. 2CHK client, 210 or 310 to be associated with a particular account.

Figure 6:
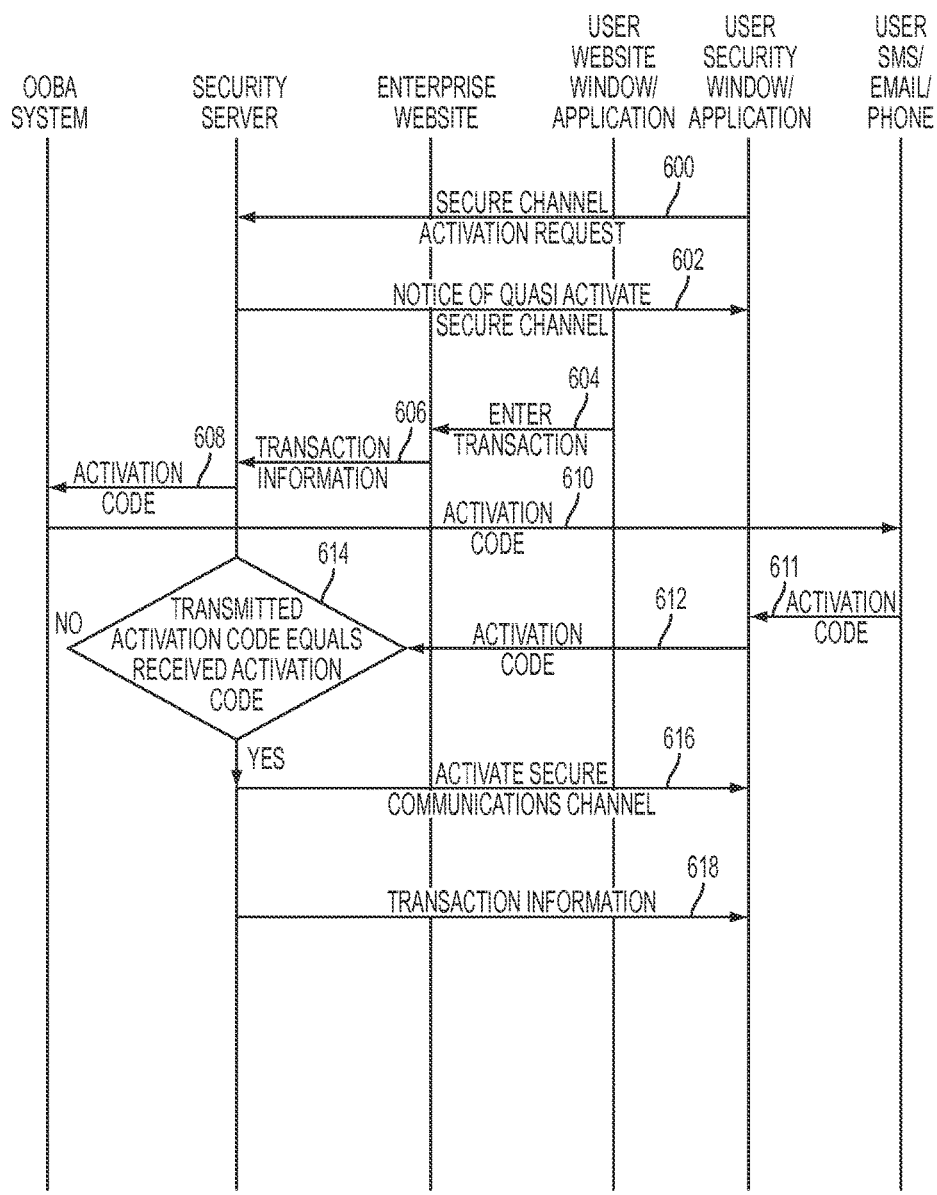
FIG. 6 depicts quasi activation of a secure communications channel in accordance with aspects of the present invention.

Once the user is validated via OOBA, the security window 120 is activated and will occupy a relatively small amount of space on the user's computing device 100 or adjunct hardware 300 (FIG. 4, step 414, or FIG. 6, step 616, or FIG. 7, step 710). The act of starting up the security window 120 also results in the security server 140 planting a local session object, e.g. a session cookie, on the user's computing device 100 or adjunct hardware 300. At this point the security server 140 will have an active secure communication channel 144 open to the user which it identifies by some user identifier, for instance the phone number used for OOBA.

The encryption of information transmitted over communications channel 144 is at two levels. First, all traffic is run over SSL. Second all traffic is also encrypted at the application level using a key derived from the security used by the user to login to the security server 140. It should be noted that, as the security window 120 and the security server 140 will be communicating over SSL, it is highly preferred that EV-SSL certificates be used. Both SSL and EV-SSL certificates are well known and understood by those skilled in the art.

In the case of the computing device 100 or adjunct hardware 300 being a smart phone or other smart mobile communications device, certain operations may, if desired, be implemented to take advantage of certain common smart phone features and capabilities.

For example, it may be beneficial to the OOBA server 150 to convey the security code to the user in a text message. In such a case, after the user receives the text message with the login security code via the SMSA 214 and can enter the received login security code into the security window 120 presented by the security application, i.e. the 2CHK client, 210 executing on the smart phone 100, or by the security application, i.e. the 2CHK client, 310 executing on adjunct hardware 300 connected to the smart phone 100, to login, i.e. validate, to the security server 140. On some smart phone platforms, the security application 210 can be configured, if so desired, to retrieve the login security code from the incoming text message stream and auto fill the login security code into the security window 120, making it even easier for users (FIG. 4, step 408, or FIG. 6, step 611, or FIG. 7, step 706).

In any event, the return message to the security application, i.e. 2CHK client, 210 or 310 from the security server 140, if the forwarded security code is valid, is a session cookie, a random number we call "nonce-login" and a time-to-live (TTL). The session cookie is stored privately, in private store 210a or 312, as applicable. The nonce-login and the TTL are stored publicly on a custom pasteboard, the security application or 2CHK client public pasteboard, which is created within public store 210b. When the user turns his/her focus to the security application, i.e. 2CHK client, 210 or 310, the security application 210 always checks the nonce and TTL to ensure that the TTL has not timed out.

Once the user has logged into the security server 140, he/she may now start using other applications, such as website application 212 or browser application 207, and return to the security application, i.e. 2CHK client, 210 as needed.

As described above, the user completes the two step activation by, for example, (i) entering the user's telephone or cell phone number into the security window 120 presented by the security application 210 or 310 executing on the user's computing device 100 or adjunct hardware 300, as applicable, and (ii) receiving an activation code from the OOBA server 150 at the entered number by voice or text message, and entering the received activation code into at the security window 120 for forwarding back to the security server 140. Step (ii) happens immediately following step (i), and thereafter the user is ready to receive transactions via the 2CHK system.

However, a potential problem could arise because the OOBA server 150 is sending the activation code it receives from the security server 140 to the phone number (via voice or text messaging) without knowing anything about the number. While this is does not open the system up to impersonation attacks, it can open the system up to nuisance attacks, e.g. an attacker entering the number of the local pizza delivery place, and a user subsequently denying rather then approving, the transaction, e.g. the pizza order, forwarded by a website, e.g. the local pizza delivery place. That is, in open model, an attacker could enter the user's phone number into the security application, i.e. 2CHK client, 210 or 310 to begin activation. This is technically not an attack, but the user will receive a nuisance call or text from the OOBA server as a result.

By modifying the above activation process such that the activation steps are performed in staggered manner, this potential problem can be ameliorated. More particularly, using staggered activation the user enters the phone number into the security window 120 presented by the security application 210 or 310 executing on the user's computing device 100 or adjunct hardware 300, as applicable, in the usual manner (FIG. 6, step 600). However, rather than immediately receiving an activation code from the OOBA server 150 at the entered number, the user is notified at the entered number that he/she is "quasi activated" and that activation will complete later (FIG. 6, step 602). Later, when an enterprise, e.g. website 130, wishes to send a transaction to a user identified by a phone number, the enterprise, e.g. website 130, sends the transaction and phone number identifying the user to the security server 140 (FIG. 6, step 606). If the security server 140 has that phone number (device combo) in the "quasi activated" state, it first sends an activation code to the OOBA server 150 to complete the activation of the user in the normal manner (FIG. 6, step 608). After activation is completed, the security server 140 sends the transaction, via communications channel 144, to the security window 120 on the user's computing device 100 (FIG. 6, step 618). Thereafter, subsequent transactions are handled in the usual manner, since the user is now fully activated, and will not require the completion of the activation.

The Website Authentication Phase

A website 130 that participates in the 2CHK system will embed, on the web page being browsed by browser 207 or website page presented by the website application 212, a code to access the 2CHK system. Typically this will be in the form of Javascript code within an iFrame. The code will reach out to the security server 140 with a request, an act that transfers to the security server 140 the previously planted local session object.

The security server 140 checks a Referrer or Origin tag of the request from the iFrame against a known white list and/or blacklist of permitted/prohibited sites. It then responds to the iFrame and simultaneously signals the security window 120 that it is in communication with. The signal consists of two parts, first an indication of whether the website 130 is "good", "bad", or that the security server 140 "does not know" the website 130. The second part of the signal is a random image that is sent (if the website 130 is legitimate) to the security window 120 and to the iFrame. For a legitimate website 130 the user's security window 120 will have a visual cue (e.g. a green light) that the website 130 is "good" and will show a random image. The iFrame will also show a similar visual cue and critically will also show the same random image. If the website 130 was on a black list the security window 120 will show a visual cue (e.g. a red light) that indicates the website 130 site is "bad".

Attackers trying to defeat the 2CHK system by creating a fake security window are thwarted because they will not know the personalization image. And, an attacker who tries to display the visual cue in the iFrame will not succeed as they do not know the random image that is sent to the security window 120. Finally, a counterfeit website will not be able to manipulate the Referrer or Origin tag as it is inspected by the browser.

The User Authentication (e.g. Website Login) Phase

Preferably, during start-up, the user is authenticated to the security server 140 using an OOBA technique performed by the OOBA server 150, at the request of security server 140, to prove possession of a phone number. After this has occurred, the security server 140 is in a position to respond to requests for user identity assertions from the website 130. To do so, the security server 140 and each respective website 130 within the 2CHK system, have a priori agreed on a different shared secret for all users participating in the 2CHK system who visit that website. That is, the security server and each website 130 have a shared secret that is not known to any user or other website and is not associated with any particular user.

When the user is at a website 130 or website application 312 that requests authentication, and the website 130 or website application 212 communicates this request to the security server 140, the security server 140 calculates a login OTP, i.e. login credentials, as a function of the secret shared with that website 130 and, if desired certain other information. For example, the OTP could be constructed based also on a time stamp or a counter based OTP algorithm, with the time or counter value being communicated by the security server 140 to the website 130 or website application 212, or potentially computed deterministically using some agreed upon formula. The security server 140 then conveys the calculated OTP to browser application 207 or security application 210, i.e. the 2CHK client, for display in the user in the security window 120. The user enters (e.g. by cutting and pasting or typing) this displayed login OTP in the appropriate area of the website page requesting user credentials, which is being displayed on the user's computing device 100 by the browser 207 or website application 212, to authenticate the user to the website 130 or website application 212.

After receipt of the entered login OTP, the website 130 authenticates the user by re-computing the OTP using the secret it shares with the security server 140. Accordingly, the 2CHK system has all the security properties of conventional OTP systems, yet has the tremendous advantage that it does not require a shared secret with each user, and it is only the security server 140 and the websites 130 that need shared secrets for the purpose of generating OTPs.

For example, in a practical application the user, using the browser 207 or website application 212, inputs a request into website window 110 to access to certain information at website 130. The request is transmitted from the website window 110 to the website 130, via communication channel 132. The web server 130 transmits this request to the security server 140 either via the user's browser application 207 or website application 212 via communication channels 132 and 142, or via optional direct communications link 134 between the website 130 and security server 140, as applicable.

The security server 140 computes a login OTP, which is sometimes referred to as a personal identification number (PIN), for website login to authenticate the user to the website 130. The login OTP is computed as a function of the secret the security server 140 shares with that particular website 130. As noted above, this shared secret is unknown to the user and is not associated with the user or any other particular user. The security server 140 then transmits this login OTP to the user's security window 120 via secure communication channel 144.

The user cuts and pastes or otherwise copies this login OTP into the website page being displayed by the web browser 207 or website application 212 in the website window 110 and the login OTP is transmitted to the website 130 via communication channel 132.

The website 130 independently computes the login password using the secret it shares with the security server 140, and compares it with the one received from the user. If the two match then the website 130 can be assured that the security server 140 is authenticating the same user that has requested access (i.e. not someone else pretending to be the user who has intercepted the request en route to the security server 140). Additionally, since the security server 140 is showing the user login OTP in an independent channel 144, user confirmation of the request is obtained.

It should be noted that the security application, i.e. 2CHK client, 210 can be programmed to communicate with the other applications, e.g. website application 212 or non-browser application 218, using the most appropriate method.

A unique advantage of the smart phone implementation is the ability to use public shared storage, such as public pasteboards on the operating system of iPhones. Accordingly, after the user confirms its desire to access website app 212, and the security server transmits a login OTP, i.e. user login authentication credentials, to the security app 210 via communications channel 144, the security app transfers the login OTP to the website app 212 using the smart phone shared storage 210b. It should however be understood that, if desired, the user could be required to manually copy the login OTP from the security window 120 to the website page displayed by the website app 212, instead of having the OTP automatically filled in. In either case, after the OTP has been filled in on the displayed website page, when the user clicks "complete login", the website app 212 sends the login OTP to the website 130 via communications channel 132.

The nonce-login and the TTL can beneficially be written to the security app, i.e. 2CHK client, 210 public pasteboard in public storage 210b. The login OTP can also beneficially be written to the pasteboard, using the website identifier and PIN combination, which is sometime referred to as a merchantid.PIN. The merchantid.PIN is written over any previously written merchantid.PIN. It should also be noted that the website application 212 checks if there is a security application 210 public pasteboard has a login-nonce with valid TTL for the user or associated with any particular user. If not, it informs the user that he/she does not appear to have logged into the 2CHK system.

In the case of login authentication, the security app, i.e. 2CHK client, 210 posts the information relating to the merchant and authentication request to the security server 140. The post includes the login-nonce. The website application 212 polls the security app, i.e. 2CHK client, 210 pasteboard to see if there is a new merchantid.PIN. Once the website application 212 locates it, it does a post to the website 130 of the string and the login OTP. The website 130 will return a success or a failure message, after it does its own verification of the login OTP.

The Transaction Authorization (e.g. Transaction Signing) Phase

Figure 5:
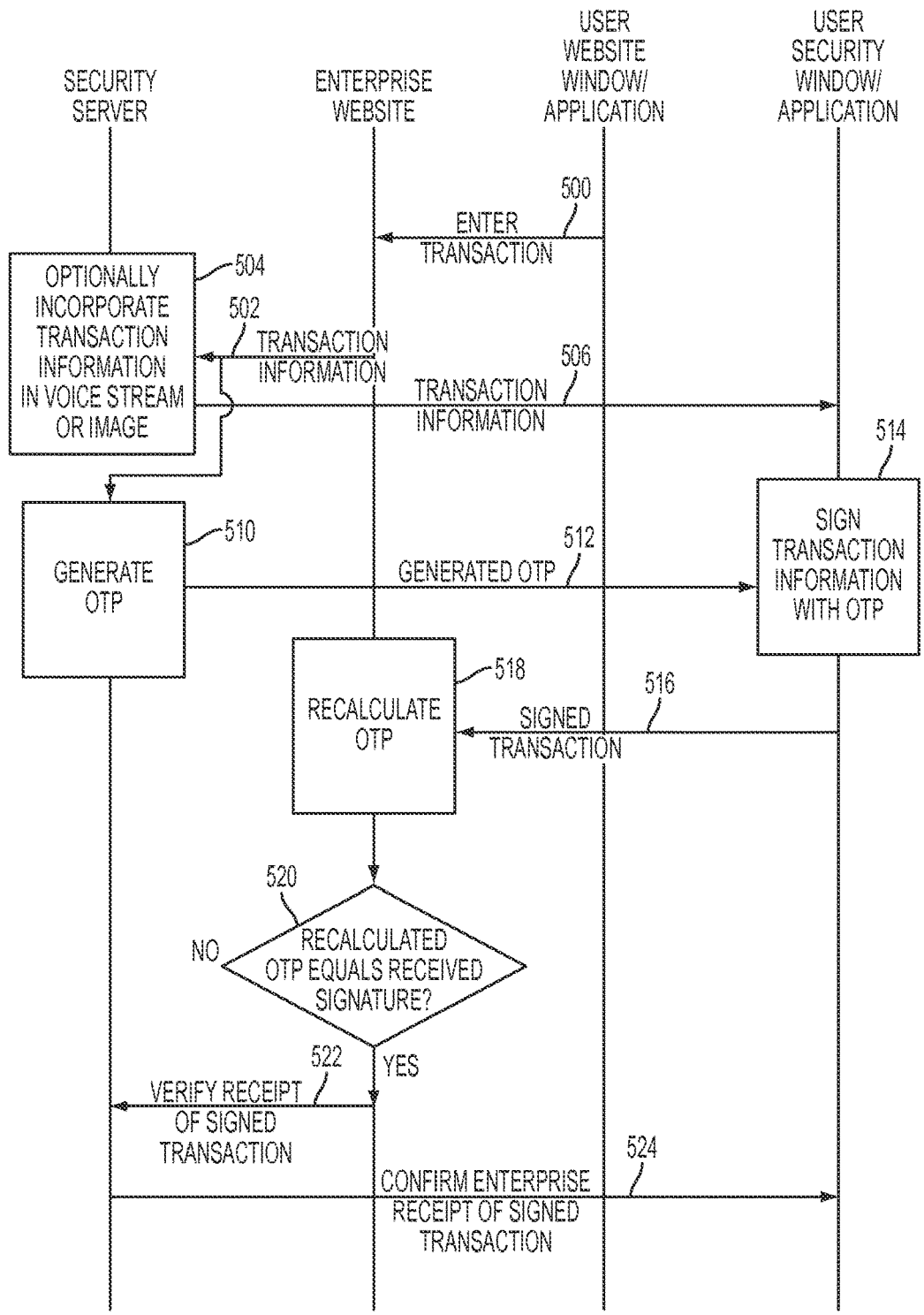
FIG. 5 depicts the signing of a transaction in accordance with aspects of the present invention.

Referring now to FIGS. 5 and 6. When the website 130 receives a transaction request from a user browser 110 that it wishes to confirm (FIG. 5, step 500, or FIG. 6, step 604), it sends the transaction information to the security server 140, either via the user's browser 110, or via a direct communication channel 134 between the website 130 and the security server 140, as discussed above (FIG. 5, step 502, or FIG. 6, step 606). The security server 140 then forwards the transaction information to the user security window 120 (FIG. 5, step 506, or FIG. 6, step 618), along with a transaction OTP, i.e. transaction signature, which will serve as the user's signature on the transaction (FIG. 5, steps 512 and 514). The transaction OTP is computed by the security server 140 based on a secret shared between the security server 140 and the website 130 and on the transaction information and on other information such as a time stamp or a counter based OTP algorithm if desired (FIG. 5, step 510). As noted above, the shared secret is not known to the user or associated with any particular user. That is, there is no requirement for a per user shared secret.

The user transfers this transaction OTP, i.e. the transaction signature, to the website 130 via the website window 110 (FIG. 5, step 516).

The website recalculates the transaction OTP, i.e. the transaction signature (FIG. 5, step 518), and if there is a match between the OTP computed by the website 130 and received from the website window 110 (FIG. 5, step 520), the website can be assured that the user has confirmed the transaction.

In a practical application, the user, who is visiting the website 130, selects a transaction from a webpage of the website 130 being displayed by the website window 110 by the browser application 207 or website application 212, e.g. "Pay Alice $100", which is transmitted by the from the website window 110 to the website 130 via communication channel 132. The website 130 transmits this transaction to the security server 140, either via the user's browser 207 over communication channels 132 and 142 or via a direct communications channel 134 between the website 130 and the security server 140, as applicable.

The security server 140 computes a transaction signature, i.e. a transaction OTP, as a function of (i) the transaction details (ii) the secret it shares with that particular website 130, and optionally other information. The security server 140 then transmits this transaction signature to the user's security window 120 via communication channel 144 and, if applicable, communications link 320.

The user cuts and pastes or otherwise copies this transaction signature into a website page of the website 130 being displayed at the website window 110 by the browser 207 or website application 212, and the transaction signature is transmitted to the website 130 via communication channel 132. The website 130 independently computes the transaction signature using the (i) the transaction details (ii) the secret it shares with the security server 140 and, if applicable, other information, and compares it with the one received from the user. If the two transaction signatures match then the website 130 can be assured that the security server 140 saw the same transaction it sent (i.e. not a transaction manipulated en route to the security server 140), and since the security server 140 is showing the user the transaction in an independent channel 144, also that user confirmation of the transaction is obtained.

In summary, the binding between the user, the security server 140 acting as an identity provider and the website 130 which is the relying party in the case of transactions made over a network, such as the purchase of a product or transfer of money by a user at the website, is significantly strengthened. Here again, it should be understood that the system has all the security properties of OTPs, yet has the tremendous advantage that it does not require a shared secret with each user, and it is only the security server 140 and each of the websites, such as website 130, that need shared secrets for the purpose of generating OTPs used as signatures on transactions. As also noted above the actual OTP can, if desired, also be constructed based on a time stamp or a counter based OTP algorithm (e.g. algorithms used such that the time or counter value is communicated by the security server 140 to the website 130) or potentially be computed deterministically using some agreed upon formula.

Here again, as noted above, in the case of the computing device 100 being a smart phone or other smart mobile communications device, certain operations may, if desired, be implemented to take advantage of certain common smart phone features and capabilities.

A unique advantage of the smart phone implementation is the ability to use public shared storage, such as public pasteboards on the operating system of iPhones. Accordingly, the website app 212 posts the transaction to the security server 140 via communications channel 142, and also asks the user to authorize the transaction at the security window 120. This is similar to a user being redirected to a payments website, such as PayPal™, to authorize a transaction. The security server 140 posts the transaction to the security app, i.e. 2CHK client, 210 via communication channel 144 for presentation to the user. After the user confirms its desire to proceed with the transaction to the security server 140, and the security server transmits the transaction OTP, i.e. transaction signature, to the security app, i.e. 2CHK client, 210 via communications channel 144, the security app 210 transfers the transaction OTP to the website app 212 using the smart phone shared storage 210b. It should however be understood that, if desired, the user could be required to manually copy the transaction OTP from the security window 120 to the page presented in the website window displayed by the website app 212, instead of having the OTP automatically filled in. In either case, after the OTP has been filled in on the displayed website page, when the user clicks "complete login", the website app 212 sends the transaction OTP to the website 130 via communications channel 132.

As with the login OTP, the transaction OTP can also beneficially be written to the pasteboard, using the website merchant identifier, i.e. merchantid, and PIN combination. The merchantid.PIN is written over any previously written merchantid.PIN. It should also be noted that the website app 212 checks if there is a security app, i.e. 2CHK client, 210 public pasteboard and, if so, polls the pasteboard to see if there is a new transaction OTP. Once the website app 212 locates it, it does a post to the website 130. The website 130 will return a success or a failure message, after it does its own verification of the transaction OTP.

To further protect the integrity of the transaction information transmitted from the security server browser application 207 or security application 210 or 310 for display in the security window, the transaction information can be sent utilizing presentation forms which are difficult to manipulate without detection, especially detection of only a portion of the transmitted information. In this regard, voice recordings and pictures are much more difficult to manipulate than text (FIG. 5, step 504).

For example, it would be very difficult to change a voice recording made at the security server 140 speaking, in a specific voice recognizable to the user, the phrase "If you agree to pay John one thousand dollars enter 34567" to "If you agree to pay Evan one thousand dollars enter 34567", without the attacker having both complex speech manipulation software and access or knowledge to the same user recognizable voice. If a specific voice, such as one chosen by the user during setup, or a background picture, is consistently used in interactions with the user, any changes would more easily be detected by the user.

In accordance with another aspect of the present invention, transaction details are presented in a form which the user can understand but which is more difficult to manipulate than straight text. For example, the transaction details can be presented at the security window 110 as a voice stream of a user recognizable voice with the transaction details embedded therein, or as a picture utilizing a user recognizable background with the transaction details embedded therein. Furthermore, the information could be presented at the security window 110 as a multimedia presentation including both a voice stream and picture as described above. In such case, the user is then required to extract, from the presentation, the transaction details before deciding whether or not the presented transaction details are in agreement with what the user understands to be the transaction details. Still further, the security server can be configured to present the content in any of various ways, for example depending on the perceived or determined risk, including in just text, or just a picture, or just a voice stream, or in multi-media including a picture and voice stream, or in text with an option for multi-media, or in multi-media with an option for text, etc.

The 2CHK system can also be adapted for user-initiated transactions. However, such transactions are typically limited to users with which the 2CHK system has an association, i.e. a user having a pre-established and currently active association with the security server 140. User-initiated transactions are also typically limited to enterprises with which the 2CHK system has an association, i.e. an enterprise having a pre-established and currently active relationship with the security server 140, such as enterprises with which the security server 140 shares a secret used to generate 2CHK login and/or transaction OTPs.

More particularly, in this model, and end user initiates a transaction with an enterprise, e.g the entity represented by website 130, via the security application, i.e. 2CHK client, 210 or 310. To do so, the user activates the security application 210 or 310 on his/her computing device or adjunct hardware as has been described above.

After the activation phase has been successfully completed, the user can select, for example from a pull down listing of participating enterprises available at the security window 120, an enterprise, with which he/she would like to enter into a transaction. The user also selects, for example from a pull down listing available at the security window 120, a transaction types to be entered into, e.g. transfer money, get balance, buy item, receive information, or get a coupon, etc. The user next enters information relevant to that transaction type at the security window 120 and hits send. In addition to the identify of the enterprise and transaction type, the relevant transaction information could, for example, be (i) the amount to be transferred, account number for the account from which the amount is to be transferred, and to whom the amount is to be transferred; or (ii) the account number for the account from which the balance is desired; or (iii) the identifier of the item to be purchased, its price, and the location to which it is to be delivered. The structure of the message and the content may, for example, be picked up from a quick response (QR) code or an NFC scan.

The entered transaction information is transmitted via communications channel 144 and, if applicable, communications link 320 to the security server 140. The security server then forwards this transaction information to the appropriate enterprise, e.g. website 130, via communications channel 134. In certain implementations, it may be desirable for the security server to also transmit risk information relating to the user together with the transaction information. In any event, the enterprise is notified or has been previously made aware that there is an existing association between the applicable user and the 2CHK system, for example based on the user's ongoing use of the security application, i.e. 2CHK client, 210 or 320 for login authentications and transaction signatures. Thus, beneficially, an enterprise receives a transaction request in structured message with recognizable content from an entity, i.e. security server 140, that has a trust (the 2CHK association), with the requester.

The enterprise, e.g. website 130, can either accept or reject the transaction request, and returns status to the security server 140 via the communications channel 134. The security server 140 passes the status message to security application, i.e. 2CHK client, 210 or 310, via communication channel 144 and, if applicable, communication link 320. The security application presents the status message to the user in security window 120.

If desired, the enterprise, e.g. website 130, may also request additional authentication of the user via OOBA, KBA or text messaged transaction OTP prior to accepting or rejecting the transaction request. If so, the user (i) enters, at the security window 120, the requested information (e.g. the transaction OTP received by the user via the OOBA server 150 from the security server 140 or in a text message received directly from the enterprise, e.g. website 130, or (ii) takes the phone call directly from the enterprise. If the OTP is entered, it is forwarded from the security window 120 via the security server 140 to the enterprise, e.g. website 130.

The enterprise, e.g. website 130, determines whether or not to complete the transaction based on the returned OTP or based on the user taking the phone call, and returns status to the security server 140 via communications channel 134 (FIG. 5, step 522). The security server 140 then passes this status information to the security application, i.e. 2CHK client, 210 or 310 for display in the security window 120 (FIG. 5, step 524).

Query Transactions

"Query" transactions can be performed to provided even greater confidence that a user is who he/she says he/she is. More particularly, a "query" transaction can be sent by any enterprise, e.g. website 130, to the security server 140, via communications channel 134 or channels 132 and 142, at any subsequent time, i.e. after activations, to "harden", i.e. give the applicable enterprise further confidence, in the identity binding by requesting the security server 140 to utilize the secure communication channel 144 to capture additional authentication information that the enterprise can compare with identity information accessible by the website 130 including, but not limited to, shared secrets, geographic location information, and biometric identifiers.

The enterprise, e.g. website 130, can send inform/confirm/sign/query transactions using the user's phone number, or a hash thereof, as index. Thus, multiple associations can be used to harden the identify binding.

For example, at any time after the user has been validated by the security server 140 and the secure communications channel 144 has been established, the website 130 can transmit a query to the security server 140 via secure communications channel 134 or via channels 132 and 142 asking the user one of more questions, such as "what is your zip code?", or "what is your favorite color", or "what is your enterprise password" or some other query or queries which allow enterprise itself to separately authenticate the user being communicated with by the security server 140 via the secure communications channel 144, based on information the enterprise knows through its own pre-existing separate relationship with the user. The security server 140 transmits the received enterprise query to the user via the secure communications channel 144 for presentation to the user in the security window 120. The user enters the answer to the presented enterprise query in the security window 120 and the security application directs transmission of the answer to the security server 140 via the secure communications channel 140. The security server 140 further transmits the received answer to the website 130 via secure communications channel 134 or via channels 132 and 142. The website 130 then compares the received answer with the correct answer to the query, which it knows to further authenticate the user, i.e. to further confirm that the user is in fact who he/she says he/she is.

System Architecture Flexibility

The system can be implemented in a flexible architecture that allows websites 130 to request or select the form factor appropriate for any given transaction. For instance, a user can simultaneously have a security window 110 on two or more different types of computing devices, e.g. simultaneously executing on his/her smart phone, desktop and/or adjunct hardware. While most transactions can be sent to her/his desktop security window 110 (which is far more convenient), higher risk transactions can be sent to their smartphone security window 110. The highest risk transaction might even be sent to his/her adjunct hardware.

Turning again to FIG. 1, as shown therein each website 130 beneficially has a security application programming interface (API) 135 operable thereon. When the user is at any of the websites 130, he/she can use the security API 135 to request transaction authentication by sending an encrypted transaction to the security server 140 via security window 110.

As noted above, the security window 110 can be implemented in any one of at least three form factors, (1) a pop-up security window controlled by a browser application 207 executing on desktop or laptop computing device, which does not require any software download, (2) a security window controlled by a security application, i.e. 2CHK client, 210 (often referred to as "security app" 210) executing on a smart phone or other smart mobile communications device, or on adjunct hardware, and (3) a security window controlled by a security application, 2CHK client, 210 executing on a desktop or laptop computing device.

The same user can beneficially use different form factors at different times. For instance, a user who has the security application, i.e. 2CHK client, 210 installed on a desktop and uses that most of the time, can use a browser pop-up security window while at some other desktop (roaming). For certain high risk transactions, the website might require showing the transaction on the security window 120 controlled by the security app 210 executing on the user's smart phone, while most transactions are shown in the security window 120 controlled by the security application 210 executing on the user's desktop. Unlike a soft token, the security window 120, or 2CHK client, itself does not contain any user secrets. Depending on the form factor, the security window 120 can be automatically started for the user at boot up time, or be manually started by the user clicking on an application icon, e.g. for the security application, i.e. 2CHK client, 210 executing on the desktop or smart phone, or on a bookmark, e.g. for the browser pop-up version.

As discussed in detail above, the user can cut and paste or otherwise insert a login OTP or a transaction OTP displayed in the security window 120 into the website window 110 displayed by the browser 207 or website application 212, that asks for the OTP. The user can also signal to the security server 140 via the security window 120 that a transaction is valid/invalid, for example by confirming that he/she wishes to proceed with or refuses to confirm the transaction. However, it should be recognized that the security window 120 can also be used to simply show the user the transaction. Thus, the security window 120 can take different forms, for example, in one presenting the user with a display of a transaction and providing the user with an OTP for logging into or signing a transaction with a website, in another presenting the user with a display of a transaction and requesting the user's confirmation of a transaction, and in still another simply presenting the user with a display of a transaction, without the user being required to do anything further.

Participating websites 130 beneficially execute the security API 135 to perform the following functional steps.

1. The website 130 calls the transaction_request( ) API which returns the encrypted transaction_request. In addition to the transaction itself (which could simply be a request for a transaction OTP), the website 130 indicates whether it wishes (i) to simply display the transaction to the user or (ii) to ensure the user clicks "OK" in the security window 110, or provides some corresponding indication that he/she approves the transaction displayed in the security window 110, or (iii) to obtain a transaction signature.

2. The encrypted transaction is then posted to the security server 140 either via the user's browser 207 or website application 212, or directly via a direct communications channel 134 between the security server 140 and the website 130.

3. The security server 140 decrypts the transaction, verifies authenticity, and then directs display of the transaction to the user in the security window 110. As noted above, if a transaction signature is requested, the security server 140 will compute the transaction OTP and also direct its display to the user in the security window 110.

4. The security server 140 then prepares an encrypted transaction_response and sends it back to the browser 207 or website application 212, in the response to the original post, which in turn transmits the encrypted transaction_response to the website 130.

5. The website 130 then calls the transaction_verify( ) API which will return the result to that website.

Crypto-Key Management

Central to the 2CHK system is the establishment of a secure, encrypted and independent communications channel 144 between the security window 120 on a user's computing device 100, e.g. the user's PC or smart mobile communications device, and the security server 140.

Crypto-key generation may be performed as follows. At some point after the security window 120 is activated, the KMLC 213 or 313 generates a private/public key pair, e.g. Du/Pu and stores the private key Du securely (typically in memory), for example in private storage 210a or 312. KMLC 213 or 313 sends the public-key Pu to the security server 140 via secure channel 144 and, if applicable, link 320, where the transmission is intercepted by the KMLS 147. A digital certificate ("Cert"), which includes the user's public key Pu, is prepared by KMLS 147, and one of two things happens.

If KMLS 147 is capable of acting as an intermediate or root certificate authority, it signs the certificate and returns the signed certificate to KMLC 213 or 313, which maintains it locally (preferably in memory), such as private storage 210a or 312. For example, KMLS 147 could sign the Cert with the private key Ds of it's private/public key pair Ds/Ps, such that [Cert]Ds is returned to KMLC 213 or 313 via secure channel 144 and, if applicable, link 320.

On the other hand, if KMLS 147 acts as a "registration authority", it forwards the certificate request via communications channel 148 to an external certificate authority 170, which creates the certificate and returns it to KMLS 147 via the same communications channel. The KMLS 147 in turn forwards, via communications channel 144, the certificate back to KMLC 213 or 313, which maintains it locally (preferably in memory), for example in private storage 210a or 312. In such a case, the Cert will be signed by the certificate authority with the private key Dca of it's private/public key pair Dca/Pca such that [Cert]Dca is returned to KMLS 147. KMLS 147 then forwards the received signed Cert, i.e. [Cert]Dca, to the KMLC 213 or 313, via secure channel 144 and, if applicable, link 320.

It is preferable in either instance for the Cert issued to be relatively short lived, i.e. temporary, and coincident with the life of the 2CHK session itself. By making it simple to do key generation coincident with activation, the need to store digital certificates and private keys locally over an extended period is avoided.

In some situations, as will be discussed in more detail below, the private key and certificate may be needed by other applications, e.g. browser 207 or non-browser application, e.g. document processor, 218, on the same computing device 100. If the underlying operating system supports standard key stores, as MS Windows™ or Apple MacOS™ do, then the KMLC 213 or 313 can be tasked with committing the keys to the key store and deleting them when appropriate.

In addition to the above described generation of keys, i.e. asymmetric keys, suitable for public key cryptography, the key management system can also generate and distribute symmetric keys. Central to this is a function Shared_Secret_Generator( ), incorporated within KMLS 147, that takes as input such factors as the UserID (perhaps the user's hard line or cell phone number), a long lived secret known only to the security server 140, and other miscellaneous parameters, and produces as output the shared_secret K. It is important to note that for a given set of inputs the same shared secret will be computed deterministically. Different authenticated entities can request the KMLS 147 to provide them with the appropriate symmetric key by providing the KMLS 147 the applicable input parameters.

Note that, depending on the application, Key Management Logic may make use of one or both of asymmetric (i.e. public) key cryptography and symmetric key cryptography capabilities described above.

Below are described some examples of how key management can be beneficially layered on top of the 2CHK architecture.

A first example relates to digital signing. In applications that require digital signing, a user needs to be provisioned a private key and a digital certificate, i.e. a binding of the user's identity and public key as certified by a certificate authority. The use of such a private key, which is not known to any 3rd party, including the security server, provides for strong non-repudiation that is necessary for some applications. Following industry convention signatures created with public key cryptography are referred to as "digital signatures". As will be understood by those skilled in the art and is discussed above, transaction signatures which are based on underlying symmetric cryptography with shared secrets, such as the transaction OTPs described above, are usually referred to as "electronic signatures".

Another example relates to key distribution.

Still another example relates to encrypted document delivery. When an encrypted file is sent to a user, for example a PDF of a brokerage statement, the user needs to be provided with the key with which the file was encrypted.

In all these examples key management adds directly to the cost of the system, and indirectly affects the security. Keys need to be generated, distributed and maintained in sync. As keys can get lost, corrupted or stolen, key management is usually a significant source of costs, and a point of vulnerability in the system.

Having described the key management system including its key generation capabilities, these three example applications will provide a further understanding on how to make use of the key management capabilities.

The first example addresses the use of the 2CHK system for digital signing. For certain applications, digital signing using public key cryptography is considered more appropriate than electronic transaction signing. To accomplish digital signing, the end user browses, using the browser 207 or website application 212, and executes a transaction with the website 130. The website 130 uses the KMLWS 137 to make a request for transaction signing with "digital signing" required. This request is sent over secure back-end communication channel 134 to KMLS 147. The request is then send from KMLS 147 to KMLC 213 or 313 via secure channel 144 and, if applicable, link 320, with an indication that a digital signature is required. The transaction signature, i.e. transaction OTP, is optionally generated by the security server 140 and sent along with the digital signature request to the security application 213 or 313 for display in the security window 120, via persistent secure connection channel 144 and, if applicable, link 320, and then displayed on the user's computing device 100, e.g. the user's PC or smart phone, etc.

The security window 120 shows the user the transaction as usual, and optionally requires the user to copy the transaction OTP, i.e. the electronic signature, into the window 110 being displayed by the browser application 207 or website application 212. In parallel the KMLC 213 or 313 computes a hash on the transaction ("HashTran") and computes a digital signature using the user's private key Du, which was previously stored in memory, the result being [HashTran]Du. This process could happen behind the scenes or by asking the user to agree to sign the transaction. In either case, the private key Du is applied to the hashed transaction [HashTran]. The digitally signed hash of the transaction [HashTran]Du is then sent, via secure communications channel 144 and, if applicable, link 320, from KMLC 213 or 313 to KMLS 147, along with the digital certificate [Cert]Ds or [Cert]Dca.

KMLS 147 can optionally perform a validation of the signature by applying the user's public key Pu to the digital signature [HashTran]Du to obtain HashTran, and comparing it to an independently generated HashTran. Whether or not validation is performed, the KMLS 147 forwards the signature, i.e. [HashTran]Du, and the certificate, i.e. [Cert]Ds or [Cert]Dca, to KMLAPI 420 via secure channel 234.

KMLWS 137 can recompute the hash HashTran and verify the signature using the user's public key Pu included in the digital certificate, Cert. Thus, the KMLWS 137 applies the KMLS 147 public key Ps to [Cert]Ds, or the Certificate Authority public key Pca to [Cert]Dca, to recover Pu. It then applies the recovered Pu to [HashTran]Du to recover Hash-Tran and compares it to an independently generated Hash-Tran to verify the signature.

Note that in the above description, the hash is created at KMLC 213 or 313. However, it could as easily be created at KMLWA 137 or KMLS 147, though it is likely that each entity would re-compute it to be assured of its authenticity.

In this example, the entire transaction comes to the security window 120. If, on the other hand, a document needs to be signed using this approach, then it is possible to extend the functionality to have the KMLC 213 or 313 commit the private key and public key to the key stores available on the user's computing device 100, which would make the keys available to other applications, e.g. browser or non-browser applications, including smart phone apps. KMLC 213 or 313 would be responsible for deleting the user keys from the key store at the appropriate time.

In the second example, the 2CHK system is used for key distribution. It frequently happens that data is encrypted and forwarded to the recipient in a store and forward system, such as email. For instance, regulations require that documents, such as financial statements or health records, must be sent encrypted if sent as email attachments. Many applications, e.g. WinZip™ and Acrobat Reader™ have built in password based encryption capabilities. The question then arises as to how the decryption password is sent to the user. One approach is to a priori agree on a shared password. Drawbacks of this approach are that a compromised password can be used to decrypt many documents, and it is also difficult to require complex passwords, as the user is likely to forget the password. Described below are three approaches of using 2CHK Key Management to solve this problem.

In the first approach, a document identified uniquely, for instance by a unique DocumentID, is encrypted with a key derived from a PIN, e.g. an eight character alpha-numeric PIN, by a website 130 and then sent to a user, e.g. via email. For purposes of this discussion, a DocumentID is a unique value associated with particular combinations of sender identification, recipient identification and document identification. When the user opens the document using some non-browser application 218, typically a software application on his/her PC, e.g. WinZip™ and Acrobat Reader™ the program sends a signal to the website 130 indicating that the user is attempting to read the particular document. Although the application 218 could instead be the browser 207, for purposes of this discussion it is assumed to be non-browser software.

The website 130 retrieves the PIN with which that document referenced by DocumentID was initially encrypted, and then uses KMLWS 137 to send the PIN to the security server 140 via communications link 134. The security server 140, using KMLS 147, forwards, via communications channel 144 and, if applicable, link 320 the PIN to KMLC 213 or 313 and the PIN is then displayed to the user within the security window 120.

The user copies the PIN into the application 218 and decryption proceeds as normal. It should be observed that, in general, no changes to the application 218 are required. The ability to trigger a message to the website 130 when opened is functionality that is already built into many applications (e.g. Adobe Reader).

One drawback of the above approach is that the website 130 has to maintain a list of DocumentIDs and PINs.

One way to solve this problem is to use a second approach and have the key with which each document is encrypted be the result of a function, which takes as input the DocumentID and a long term secret known only to the website 130. This way the key can be generated dynamically after the user attempts to open the document as described in the first approach.

A drawback of the second approach is that there is an assumption that the website 130 is available and on-line when the document is opened. As some of the systems that generate and distribute documents are back-end batch systems, this assumption may not always be applicable.

In a third approach, 2CHK key management shared secret generation capability can be used to solve the problem as follows.

The website 130 sends the security server 140, either one at a time, or more likely in a batch file, the DocumentIDs it wants to encrypt. For purposes of this discussion it will be assumed that the file contains envelope information such as sender and recipient IDs. KMLS 147 uses the Shared_Secret_Generator( ) described above to compute encryption keys for each DocumentID. For example, key K1 for one DocumentID, K2 for another DocumentID, K3 for yet another DocumentID, etc. These keys are then returned by the KMLS 147 to website 130. The website 130 then encrypts each respective document with the applicable key and sends the encrypted document, e.g. via email, to the respective applicable users.

The applicable user uses the other desktop software 218 to open the document, which triggers a request for a key directly to the security server 140 over a secure web connection (not shown). It should be noted that this is a direct connection from the non-browser application 218 to the security server 140, and not through security window 120.

This action results in the KMLS 147 using the Shared_Secret_Generator( ) to re-compute the applicable encryption key, e.g. K1, K2, K3 etc. The applicable key is then sent, via secure channel 144 and, if applicable, link 320, to KMLC 213 or 313 and displayed to the user in security window 120 for copying into the window displayed by the non-browser software 218 as described earlier.

While the above has been described using a non-browser software application 218 (e.g. Acrobat Reader), the same functionality can be used for browser based web applications.

Crypto-Key Seeding

Referring now to FIG. 7. When users are provisioned a token authenticator, either for a one time password generator or a transaction authenticator, the user's token needs to be provided with a shared secret key. Those skilled in the art will recognize that in this context, the shared secret key is often characterized as a "seed". The 2CHK key management described above can also be used for "seeding" OTPs and Transaction Authentication Tokens. OTPs and Transaction Authentication token authenticators all require a key that is stored in the token and is also stored at the back-end system. Managing these keys (which are commonly referred to as "seeds") introduces costs and complexity. 2CHK key management can be used to greatly simplify this process.

For purposes of this discussion it is assumed that a token authenticator (not shown) is implemented as hardware, software or as a mobile phone app. The token starts in an inactive state with no seed present (or a seed refresh is required). A request is made either directly from within the security window 120 by the user or directly from the token to the security server 140 via communications channel 144 (FIG. 7, step 711) or to an external website 130 requesting a seeding event. Some unique identifier identifying the user is provided to the security server 140 or website 130, as applicable.

The KMLS 147 within the security server 140 uses the unique UserID and other information, including the long term secret known only to KMLS 147, as inputs into the Shared_Secret_Generator( ) to generate a unique seed (i.e. key) for that user. For example, "seeding" a seed at the time of each activation can include generating the seed based on the user's phone number (or other ID) and a secret known only to the 2CHK service. Such a seed, although regenerated at each activation, will have the same value each time it is generated. However, the seed could be generated to have a different value at each activation, by using a somewhat modified algorithm.

This seed is sent back to KMLC 213 or 313 via the secure channel 144 and, if applicable, link 320 (FIG. 7, step 712), and then displayed to user in the security window 120. The user enters the seed into the software or smart phone app token. It should be noted that the actual seed may be generated by a function that transforms the seed the user enters. It will also be recognized that for hardware this will only work if the token has a keypad, which most transaction authenticators do indeed have.

As a variant of the above, observe that the transaction authenticator can be built directly into the security application 210 or 310 as part of the functionality. While at first blush the rationale for this may not be obvious, compatibility with existing systems such as EMV/CAP provides the rationale for this approach. This on-demand seeding of the transaction authenticators vastly simplifies the costs of provisioning.

As noted above, the security app, i.e. 2CHK client, 310 on the adjunct hardware can also be "seeded" to generate OTP tokens using the techniques described above. This means that OTPs can now be securely generated on adjunct hardware even when it is no longer connected to the computing device 100. While seeding related operations with the adjunct hardware 300 connected to the computing device 100 have been covered in detail above, the following addresses how certain of those operations can be performed with the adjunct hardware 300 disconnected from the computing device 100. For purposes of this discussion it is assumed that a token authenticator (not shown) is implemented as hardware, as software or as a adjunct hardware app.

The token starts in an inactive state with no seed present (or a seed refresh is required). After the adjunct hardware 300 has been disconnected from the computing device 100, the stored seeds (FIG. 7, step 714), which were received with the adjunct hardware 300 connected to the computing device 100, can, if desired, be shown to the user by the security app, i.e. the 2CHK client, 310 in a security window 120 displayed on the screen 302 of the adjunct hardware 300. The user can then enter the seed into the token generator (not shown) being executed by the CPU 305 of the adjunct hardware 300. Again, we note that the actual seed may be generated by a function that transforms the seed the user enters. It will also be recognized that for hardware token generators this will only work if the token generator has a keypad, which most transaction generators do indeed have.

As described above, "seeding" of an OTP is performed with a seed at the time of each activation, i.e. during the start up and activation stage. Specifically, the seed, i.e. key, is generated based on the user's phone number, or other user identifier, and a secret known only to the security server 140. This seed is regenerated at each activation, but will have the same value.

An alternate approach is generate the seed at initial association, i.e. during the set up and personalization phase, and to store the seed, either in whole or in part, locally and persistently. Thus, in the alternate approach the seed is not necessary regenerated, or regenerated in its entirety, at each new activation. A primary benefit of this approach is that, if an attacker uses call forwarding or some other mechanism to hijack the user's phone number and creates a new activation, the attacker will not have knowledge of the seed. Thus, if that seed is used to generate a transaction OTP, an attacker who does not have that seed will be thwarted.

What we claim is:

1. A method of operating a security server to securely transact business between a user and an enterprise via a network, comprising:
   receiving, at the security server from an enterprise with which the user is currently connected via the network, a request of the enterprise to activate a secure communications channel over the network between the user and the security server, wherein the request includes contact information for contacting the user via other than the network;
   transmitting, by the security server in response to the received activation request, an activation code for delivery to the user via other than the network and corresponding to the received contact information;
   receiving, at the security server from the user via the network, an activation code;
   comparing, at the security server, the received activation code with the transmitted activation code to validate the received activation code;
   activating the secure communications channel based on the validation of the received activation code, wherein the activated secure communications channel is a channel in which data is encrypted based on the validated received activation code;
   receiving, at the security server, transaction information including an identifier for identifying the enterprise;
   generating, at the security server based on the received transaction information, a one-time password for use by the user as a transaction signature, wherein:
   the one-time-password is generated as a function of the identifier and a secret known only by the security server and the enterprise;
   and the secret comprises a predetermined value agreed upon by both the security server and the enterprise to be used for generating all additional one-time passwords for all additional users transacting business with the enterprise;
   transmitting the generated one time password from the security server to the user via the secure communications channel;
   receiving, by the enterprise, the transmitted one time password to the enterprise from the user;
   comparing, by the enterprise, the received one time password and a calculated one time password calculated by the enterprise using the secret and the identifier;
   and transacting, by the enterprise, the business when the comparison is a match.

2. The method of claim 1, further comprising:
   transmitting the received transaction information, from the security server to the user via the secure communications channel, wherein the transaction information comprises an identifier of the enterprise and details of a transaction which the user desires to enter into with the enterprise.

3. The method of claim 2, wherein the enterprise is a first enterprise, the transaction information is first transaction information, and further comprising:
  receiving, at a security server, second transaction information including an identifier of a second enterprise and details of a second transaction which the user desires to enter into with the second enterprise; and
  transmitting the second transaction information, from the security server to the user via the secure communications channel.

4. The method of claim 3, wherein a valid user signature on the second transaction is required by the second enterprise, further comprising: generating, at the security server based on the received second transaction information, a second one-time password for use by the user as a transaction signature; transmitting the generated second one time password from the security server to the user via the secure communications channel; receiving, at the security server from the second enterprise, confirmation of receipt by the second enterprise from the user of the second transaction validly signed with the transmitted second one time password; and transmitting, from the security server to the user via the secure communications channel, confirmation that the second enterprise received the validly signed second transaction.

5. The method of claim 2, further comprising:
  incorporating, at the security server, the received transaction information into at least one of a voice stream and an image;
  wherein the transmitted transaction information is the transaction information incorporated into the at least one of the voice stream and the image.

6. The method of claim 5, wherein the voice stream is a voice stream having a voice recognizable by the user and the image is an image having a background known to the user.

7. A method of operating a security server to securely transact business between a user and an enterprise via a network, comprising:
  receiving, at the security server from the user, a request of the user, including contact information for contacting, the user via other than the network, to activate a secure communications channel over the network between the user and the security server;
  transmitting, by the security server to the user via the network response to the received activation request, notification that the secure communications channel is quasi activated;
  receiving, at the security server, transaction information including an identifier of an enterprise and details of a transaction which the user desires to enter into with the enterprise;
  transmitting, by the security server in response to the received transaction information, an activation code for delivery to the user via other than the network and corresponding to the received contact information;
  receiving, at the security server from the user via the network, an activation code;
  comparing, at the security server, the received activation code with the transmitted activation code to validate the received activation code;
  activating the secure communications channel based on the validation of the received activation code, wherein the activated secure communications channel is a channel in which data is encrypted based on the validated received activation code;
  transmitting the transaction information, from the security server to the user via the activated secure communications channel;
  generating, at the security server based on the received transaction information, a one-time-password for use by the user as a transaction signature, wherein:
    the one-time-password is generated as a function of the identifier and a secret known only by the security server and the enterprise;
    and the secret comprises a predetermined value agreed upon by both the security server and the enterprise to be used for generating all additional one-time passwords for all additional users transacting business with the enterprise;
  transmitting the generated one time password from the security server to the user via the secure communications channel;
  receiving, by the enterprise, the transmitted one time password to the enterprise from the user;
  comparing, by the enterprise, the received one time password and a calculated one time, password calculated by the enterprise using the secret and the identifier;
  and transacting, by the enterprise, the business when the comparison is a match.

* * * * *